US011095381B2

(12) United States Patent
Brown et al.

(10) Patent No.: US 11,095,381 B2
(45) Date of Patent: Aug. 17, 2021

(54) LEGACY TIME DIVISION MULTIPLEXING (TDM) SERVICE SUPPORT IN A PACKET NETWORK AND ON A PACKET NETWORK ELEMENT

(71) Applicant: Ciena Corporation, Hanover, MD (US)

(72) Inventors: Christopher John Brown, Stittsville (CA); Craig Donald Suitor, Nepean (CA); Matthew Yuen, Ottawa (CA); Alexander Young, Ottawa (CA); Sitaram Patro, Stittsville (CA); Stuart White, Nepean (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/564,257

(22) Filed: Sep. 9, 2019

(65) Prior Publication Data

US 2020/0092023 A1 Mar. 19, 2020

Related U.S. Application Data

(60) Provisional application No. 62/730,923, filed on Sep. 13, 2018.

(51) Int. Cl.
*H04J 3/06* (2006.01)
*H04L 12/931* (2013.01)
*H04L 5/14* (2006.01)
*H04J 14/08* (2006.01)

(52) U.S. Cl.
CPC ............ *H04J 3/0632* (2013.01); *H04J 14/08* (2013.01); *H04L 5/1469* (2013.01); *H04L 49/50* (2013.01)

(58) Field of Classification Search
CPC ....... H04J 3/0632; H04J 14/08; H04L 5/1469; H04L 49/50
USPC .......................................................... 370/498
See application file for complete search history.

(56) References Cited

U.S. PATENT DOCUMENTS

| 7,535,893 | B1* | 5/2009 | Beladakere | ......... H04L 12/5601 370/353 |
| 9,621,421 | B1* | 4/2017 | Tolentino | ................. H04L 43/16 |
| 2006/0023750 | A1* | 2/2006 | Kim | ........................ H04L 49/30 370/473 |
| 2008/0317008 | A1* | 12/2008 | Forte-McRobbie | ........................ H04L 65/1026 370/352 |
| 2009/0080338 | A1* | 3/2009 | Parker | ..................... H04L 41/00 370/250 |
| 2013/0022349 | A1* | 1/2013 | Sarwar | ................. H04L 41/0663 398/2 |
| 2018/0254986 | A1* | 9/2018 | Solomon | ................ H04L 47/825 |
| 2019/0253340 | A1* | 8/2019 | Kangas | .................... H04L 45/24 |

* cited by examiner

*Primary Examiner* — Candal Elpenord
(74) *Attorney, Agent, or Firm* — Clements Bernard Walker; Lawrence A. Baratta, Jr.; Christopher L. Bernard

(57) ABSTRACT

A network element includes at least two Time Division Multiplexing (TDM) modules each including a TDM client interface, TDM processing circuitry, and circuit emulation circuitry; and a packet switch fabric connected to the at least two TDM modules and configured to output a packet interface, wherein a protected TDM service through the at least two TDM modules is provided as a single packetized TDM stream via the packet interface from the packet switch fabric.

14 Claims, 18 Drawing Sheets

LEGACY TIME DIVISION MULTIPLEXING (TDM) SERVICE SUPPORT IN A PACKET NETWORK AND ON A PACKET NETWORK ELEMENT

CROSS-REFERENCE TO RELATED APPLICATION(S)

The present disclosure claims priority to U.S. Provisional Patent Application No. 62/730,923, filed Sep. 13, 2018, and entitled "Legacy Time Division Multiplexing (TDM) service support in a packet network and on a packet network element," the contents of which are incorporated by reference herein.

FIELD OF THE DISCLOSURE

The present disclosure generally relates to networking systems and methods. More particularly, the present disclosure relates to systems and methods for legacy Time Division Multiplexing (TDM) service support in a packet network and on a packet network element.

BACKGROUND OF THE DISCLOSURE

For the foreseeable future network service providers will need to support legacy TDM services alongside new packet services. For example, legacy TDM services can include signals supported in Synchronous Optical Network (SONET), Synchronous Digital Hierarchy (SDH), etc. These signals are provided as services to end customers and differ from packet services in that the TDM signal maintains its provided bandwidth all of the time, i.e., there is no committed and excess rate. Networks at Layer 1 in the past used SONET/SDH as the TDM technology with the legacy TDM services. The network today has moved away from SONET/SDH to Optical Transport Network (OTN) and Ethernet with the primary services being packet.

With the use of circuit emulation technology, TDM signals can be packetized allowing both TDM and packet services to be supported within the same packet network as well as on a single packet-based network element within the packet network. Beyond simple transport of the packetized TDM service, the packet network element must support traditional TDM protection mechanisms such as 1:1, 1+1, or 1:N equipment protection. Conventional solutions for traditional TDM protection fall into two broad categories, protection switching at the individual packet service level and use of a subtended TDM network element to implement the TDM equipment protection.

With service level protection switching, each circuit emulated TDM service is individually switched in a packet switch fabric depending upon the state of the protected equipment cards. This can result in hundreds or thousands of services being reconfigured to handle a single equipment switch resulting in protection switch times that exceed the recommendations in the corresponding Telcordia and ITU-T standards, e.g., such as within 50 ms or less. This implementation approach also limits the total number of TDM services that can be supported as each individual TDM service requires two packet services to be provisioned in the packet switch fabric. Disadvantageously, the protection switch times increase as the service level increases. To address the scaling issues with a large number of services, substantial increases in processing power, as well as messaging throughput, are required. This adds cost to the overall solution in terms of physical components, thermal, and power mitigation and software complexity. As both active and standby TDM traffic needs to be circuit emulated and forwarded to the packet switch fabric, the number of packet services that need to be supported by the packet switch fabric is doubled. This is typically an issue as packet switch fabrics have both hardware and software related limits on the number of services that can be supported.

With a subtended TDM network element, the 1:1, 1+1, or 1:N equipment protection is processed on the TDM network element, and the selected TDM path is forwarded to the packet based network element for processing. This approach has a higher capital cost with the need for an extra network element equipment, i.e., a larger operating cost with the additional office space and Operations, Administration, and Maintenance (OAM) costs for an extra network element. The interconnect between the subtended TDM network element, and the packet-based network element adds cost and decreases the overall reliability of the solution due to the additional failure points.

Also, to accomplish circuit emulation for TDM signals, a TDM to packet gateway function is required. However, TDM switching protection (Line Terminating Equipment (LTE)) is not integrated into the TDM gateway. This requires a separate network element leading to higher capital cost, larger operating expenses, additional cabling leading to the additional risk of failure, and a single port of failure.

Further, legacy TDM services require electrical interconnects, e.g., coaxial cabling. Conventional approaches to support electrical interconnects can be either a fully passive Input/Output (I/O) expansion chassis or a purpose-built subtended network element. The fully passive I/O expansion chassis supports the termination of the large electrical I/O cables with an interconnection to the network element via a slightly smaller and higher density electrical cable. The fully passive I/O expansion chassis requires the use of high density connectors on tributary cards which limits the number of clients that can be supported due to connector size. Also, the interconnect cable between the chassis and network element, while smaller than large electrical I/O cable, is still significantly larger than a fiber or Category (CAT) 5/6 cable. Other disadvantages of a passive I/O expansion chassis include the lack of Light Emitting Diode (LED) indicators for troubleshooting, the inability to appear in network element inventory, and protection limitations.

The purpose-built subtended network element is typically a small network element which is dedicated to the termination and processing of legacy electrical signals. This small network element requires dedicated power connections, is actively cooled and is connected to the main network element via optical fibers or CAT5/6 electrical cables. Disadvantageously, the purpose-built subtended network element has dedicated power connections, has higher power consumption, has an active cooling system (i.e., fans), is managed as a separate network element which includes provisioning and upgrades, thereby adding complexity and cost.

BRIEF SUMMARY OF THE DISCLOSURE

In an embodiment, a network element includes at least two Time Division Multiplexing (TDM) modules each including a TDM client interface, TDM processing circuitry, and circuit emulation circuitry; and a packet switch fabric connected to the at least two TDM modules and configured to output a packet interface, wherein a protected TDM service through the at least two TDM modules is provided as a single packetized TDM stream via the packet interface from the packet switch fabric. The at least two TDM modules each can further include a TDM fabric between the TDM processing circuitry and the circuit emulation circuitry, and wherein the TDM fabric on each of the at least two TDM modules can be interconnected to one another. For ingress, the TDM fabric can be configured to select a working line of the protected TDM service for packetization by the circuit emulation circuitry, and, for egress, the TDM fabric can be configured to broadcast the single packetized TDM stream to both the working line and a protection line of the protected TDM service. The TDM fabric can be further configured to switch TDM signals between the at least two TDM modules, independent of the packet switch fabric.

The packet switch fabric can include a Link Aggregation Group (LAG) with each leg of the LAG being connected to the circuit emulation circuitry of a corresponding TDM module. Each of the at least two TDM modules can include a Finite State Machine (FSM) that provides status to LAG control on the packet switch fabric. The at least two TDM modules can include N TDM modules, N is an integer, and wherein there are N LAGs, one for each of the N TDM modules to support 1:N protection.

The protected TDM service can be one of a Plesiochronous Digital Hierarchy (PDH) signal, Synchronous Optical Network (SONET) signal, and a Synchronous Digital Hierarchy (SDH) signal. The network element can further include a distributed input/output module connected to one of the at least two TDM modules via a cable and including a plurality of electrical interfaces.

In another embodiment, an apparatus includes Time Division Multiplexing (TDM) processing circuitry configured to interface TDM clients; circuit emulation circuitry connected to the TDM processing circuitry and configured to packetize TDM traffic streams; and a packet switch fabric connected to the circuit emulation circuitry and configured to output a packet interface, wherein a protected TDM service through the TDM processing circuitry is provided as a single packetized TDM stream via the packet interface from the packet switch fabric. The apparatus can further include a TDM fabric between the TDM processing circuitry and the circuit emulation circuitry. For ingress, the TDM fabric can be configured to select a working line of the protected TDM service for packetization by the circuit emulation circuitry, and, for egress, the TDM fabric can be configured to broadcast the single packetized TDM stream to both the working line and a protection line of the protected TDM service. The TDM fabric can be further configured to switch TDM signals between the TDM clients, independent of the packet switch fabric.

The packet switch fabric can include a Link Aggregation Group (LAG) with each leg of the LAG being connected to the circuit emulation circuitry of a corresponding TDM client, and wherein switching between the TDM clients is performed via LAG reconfiguration. The apparatus can further include a Finite State Machine (FSM) that provides status to LAG control on the packet switch fabric. The protected TDM service can include N TDM clients, N is an integer, and wherein there are N LAGs, one for each of the N TDM clients to support 1:N protection.

In a further embodiment, a method includes receiving a protected Time Division Multiplexing (TDM) client that includes a working line and a protection line; processing each of the working line and the protection line for the protected TDM client; packetizing one or both of the working line and the protection line; and outputting a single packetized TDM stream based on the working line via a packet interface from a packet switch fabric. The method can further include processing each of the working line and the protection line, wherein, for ingress, the TDM fabric is configured to select the working line for the packetizing, and, wherein, for egress, the TDM fabric is configured to broadcast the single packetized TDM stream to both the working line and the protection line. The method can further include operating a Link Aggregation Group (LAG) on the packet switch fabric with each leg of the LAG being connected to the working line and the protection line. The method can further include operating a Finite State Machine (FSM) to provides status to LAG control on the packet switch fabric.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
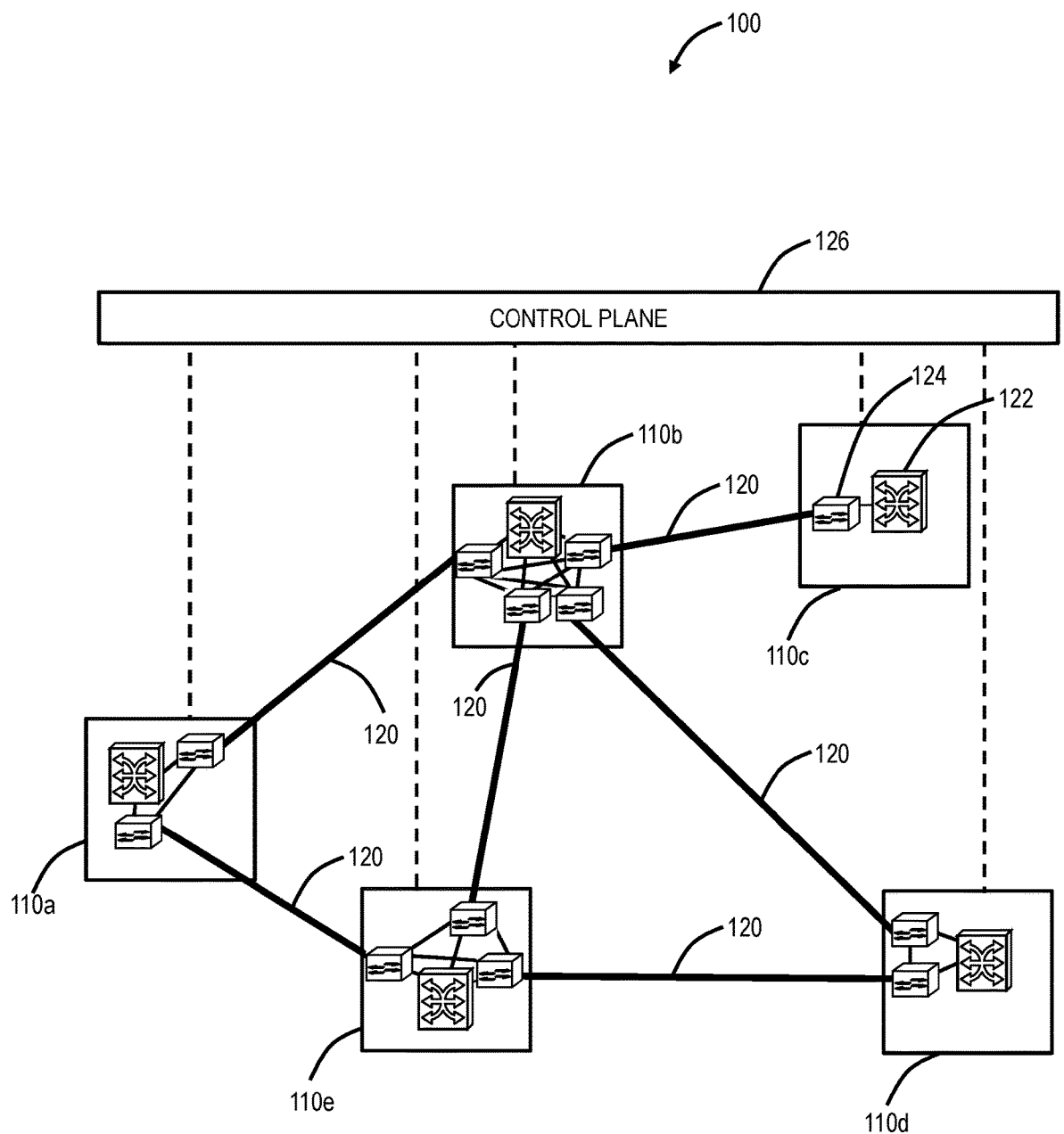
FIG. 1 is a network diagram of an example network with five interconnected sites.

The present disclosure relates to systems and methods for legacy Time Division Multiplexing (TDM) service support in a packet network and on a packet network element. The systems and methods described herein include TDM equipment protection with a packet switch fabric, a cascaded TDM and packet fabric, and a distributed Input/Output (I/O) module for electrical clients. Generally, the present disclosure includes hardware modules also referred to as circuit packs, line modules, blades, etc. in a configuration supporting legacy TDM services over a packet network, on a packet network element. For description herein, such modules may also be referred to as "cards." Again, the legacy TDM services include signals supported in Synchronous Optical Network (SONET), Synchronous Digital Hierarchy (SDH), etc. such as Synchronous Transport Signal (STS)–n (n=1, 2, 3, . . . ), Optical Carrier (OC)–m (m=1, 2, 3, . . . ), Synchronous Transport Module (STM) level x (x=1, 2, 3, . . . ), Digital Signal 1 (DS1), Digital Signal 3 (DS3), E-carrier 1 (E1), E-carrier 3 (E3), EC1, etc. Example TDM services can include STS-1, STS-3, STS-3c (concatenated), OC-3/STM-1 (155 Mb/s), OC-48/STM-16 (2.5 Gb/s), OC-192/STM-64 (10 Gb/s), Virtual Tributary (VT) signals (e.g., VT-1.5, VT-2, etc.), Virtual Container (VC) signals (e.g., VC-11, VC-12, VC-3, VC-4, VC-4-4c, VC-4-16c, etc.), etc.

In an embodiment, the cascaded TDM and packet fabric is used to achieve equipment/facility protection in TDM gateways where paths only enter the packet domain if their circuits need to switch beyond the scope of the TDM fabric. This approach can include egress packet domain Link Aggregation Group (LAG) distribution with ingress TDM domain selection/bridging. The cascaded TDM and packet fabric includes hardware signal controlled coordination of circuit emulation. The cascaded TDM and packet fabric enables LAG distribution/selection and a system of TDM path selection to perform TDM path switching for equipment protection. This includes an ability to provide equipment protection on a per path basis rather than per card.

In another embodiment, the TDM equipment protection with a packet switch fabric includes packet domain LAG collection and distribution to implement TDM equipment protection in a packet network element. This provides a flexible implementation supporting 1:1, 1+1, or 1:N TDM equipment protection schemes. The TDM equipment protection includes hardware and software control for the coordination of circuit emulation enabling and disabling on active and standby TDM gateway cards, and LAG collection and distribution in the Packet Switched Fabric. This approach maximizes the use of the number of packet services supported by the packet switch fabric.

The distributed I/O module provides functions as both an Analog-to-Digital Converter (ADC) and signal multiplexer allowing digital interconnect to the network element. The distributed I/O module increases the density of client electrical interfaces that can be supported by a tributary card by removing analog components and Line Interface Unit (LIU) devices from the tributary card. Advantageously, the distributed I/O module has a normalized interface with the tributary card, allowing different electrical client types to be supported by the same interface card. This normalized interface allows for the mixing of different distributed I/O modules and hence electrical client types in 1:1, 1+1 and 1:N configurations which is not possible in traditional TDM equipment. For example in a traditional TDM system a 1:N group would typically require all N working cards to be of the same type, i.e. DS1. Utilizing the distributed I/O module with the normalized interface allows for mixing DS1, DS3, E1, E3 or EC1 clients within the 1:N group. This approach effectively increases the circuit board area available overall by moving the electrical protection and ADC to the distributed I/O module. This frees up circuit board area on the tributary card which in turn results in support for a higher density of electrical signals than is typically possible. The distributed I/O module can be located a distance apart from the network element and supports 1+1, 1:1, and 1:N electrical protection configurations with no external Y-cable or impact to electrical interface reach. The distributed I/O module is an active I/O expansion chassis powered from the network element negating the need for dedicated power installation is passively cooled and supports multiple mounting options allowing for front or rear access to the electrical I/O terminations.

Network

FIG. 1 is a network diagram of an example network 100 with five interconnected sites 110a, 110b, 110c, 110d, 110e. The sites 110 are interconnected by a plurality of links 120. Each of the sites 110 can include a switch 122 and one or more Wavelength Division Multiplexed (WDM) network elements 124. The switch 122 is configured to provide services at Layer 0 (DWDM, photonic), Layer 1 (e.g., Optical Transport Network (OTN), SONET, SDH, etc.), and/or Layer 2 (e.g., Ethernet). The WDM network elements 124 provide the photonic layer (i.e., Layer 0) and various functionality associated therewith. Of note, while shown separately, those of ordinary skill in the art would understand the switch 122 and the WDM network elements 124 may be realized in the same network element or each in multiple network elements. The network 100 is illustrated, for example, as an interconnected mesh network, and those of ordinary skill in the art will recognize the network 100 can include other architectures, with additional sites 110 or with fewer sites 110, with additional network elements and hardware, etc.

The sites 110 communicate with one another optically over the links 120. The sites 110 can be network elements which include a plurality of ingress and egress ports forming the links 120. Further, the sites 110 can include various degrees, i.e., the site 110c is a one-degree node, the sites 110a, 110d are two-degree nodes, the site 110e is a three-degree node, and the site 110b is a four-degree node. The number of degrees is indicative of the number of adjacent nodes 110 at each particular node 110. The network 100 includes a control plane 126 operating on and/or between the switches 122 and/or the WDM network elements 124 at the sites 110a, 110b, 110c, 110d, 110e. The control plane 126 includes software, processes, algorithms, etc. that control configurable features of the network 100, such as automating discovery of the switches 122, capacity of the links 120, port availability on the switches 122, connectivity between ports; dissemination of topology and bandwidth information between the switches 122; calculation and creation of paths for connections; network level protection and restoration; and the like. In an embodiment, the control plane 126 can utilize Automatically Switched Optical Network (ASON), Generalized Multiprotocol Label Switching (GMPLS), Optical Signal and Routing Protocol (OSRP) (from Ciena Corporation), or the like. Those of ordinary skill in the art will recognize the optical network 100 and the control plane 126 can utilize any type control plane for controlling the switches 122 and/or the WDM network elements 124 and establishing connections. Also, the network 100 can include Software Defined Networking (SDN) control, with or without the control plane 126.

Example Network Element/Node

Figure 2:
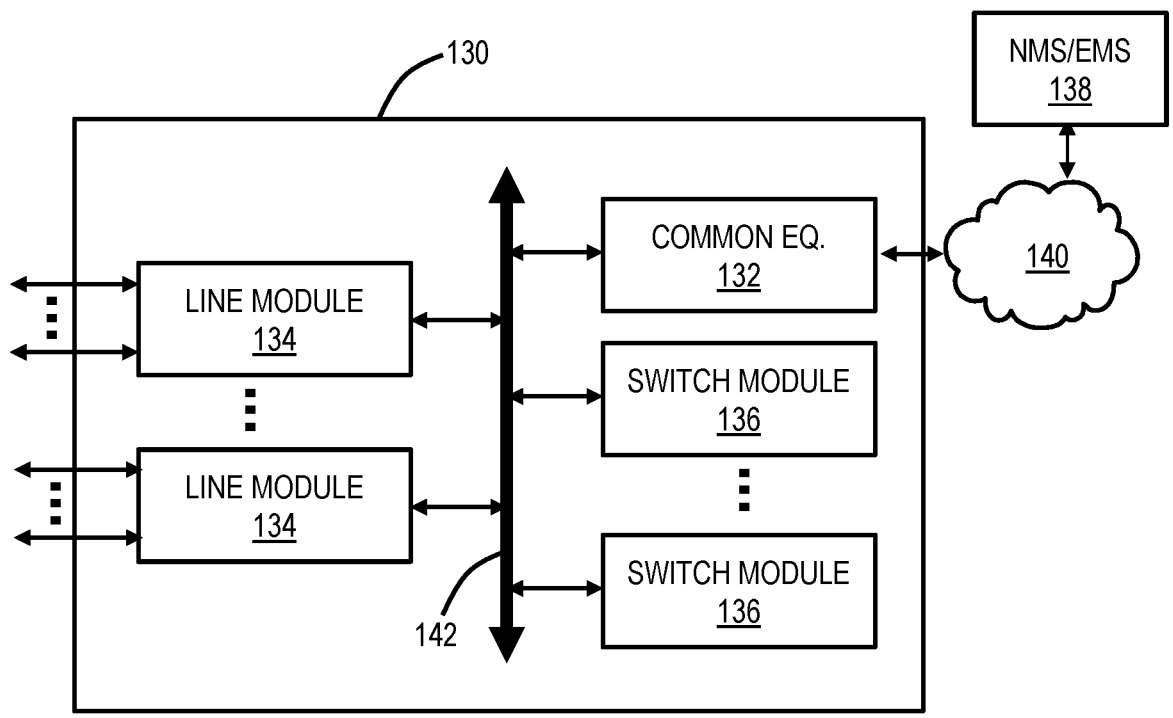
FIG. 2 is a block diagram of a node for use with the systems and methods described herein.

FIG. 2 is a block diagram of a network element 130 for use with the systems and methods described herein. The network element 130 can be the switch 122, the WDM network element 124, or the like. In an embodiment, the network element 130 can be a network element that may consolidate the functionality of a Multi-Service Provisioning Platform (MSPP), Digital Cross-Connect (DCS), Ethernet and/or Optical Transport Network (OTN) switch, Wave Division Multiplexed (WDM)/Dense WDM (DWDM) platform, Packet Optical Transport System (POTS), etc. into a single, high-capacity intelligent switching system providing Layer 0, 1, 2, and/or 3 consolidation. In another embodiment, the network element 130 can be any of an OTN Add/Drop Multiplexer (ADM), a Multi-Service Provisioning Platform (MSPP), a Digital Cross-Connect (DCS), an optical cross-connect, a POTS, an optical switch, a router, an Ethernet switch, a Wavelength Division Multiplexing (WDM) terminal, an access/aggregation device, etc. In a further embodiment, the network element 130 is a packet network element which supports legacy TDM services. The network element 130 can be a system with ingress and egress digital signals and switching of channels, timeslots, tributary units, etc.

The network element 130 can include common equipment 132, one or more line modules 134, and one or more switch modules 136. The common equipment 132 can include power; a control module; Operations, Administration, Maintenance, and Provisioning (OAM&P) access; user interface ports; and the like. The common equipment 132 can connect to a management system 138 through a data communication network 140 (as well as a Path Computation Element (PCE), SDN controller, OpenFlow controller, etc.). The management system 138 can include a Network Management System (NMS), Element Management System (EMS), or the like. Additionally, the common equipment 132 can include a control plane processor, such as a controller 150 illustrated in FIG. 3 configured to operate the control plane as described herein. The network element 130 can include an interface 142 for communicatively coupling the common equipment 132, the line modules 134, and the switch modules 136 to one another. For example, the interface 142 can be a backplane, midplane, a bus, optical or electrical connectors, or the like. The line modules 134 are configured to provide ingress and egress to the switch modules 136 and to external connections on the links to/from the network element 130. In an embodiment, the line modules 134 can form ingress and egress switches with the switch modules 136 as center stage switches for a three-stage switch, e.g., a three-stage Clos switch. Other configurations and/or architectures are also contemplated.

The line modules 134 can include optical transceivers. Further, the line modules 134 can include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s, N×1.25 Gb/s, and any rate in between as well as future higher rates. The line modules 134 can include wavelength division multiplexing interfaces, short reach interfaces, and the like, and can connect to other line modules 134 on remote network elements, end clients, edge routers, and the like, e.g., forming connections on the links in the network 100. From a logical perspective, the line modules 134 provide ingress and egress ports to the network element 130, and each line module 134 can include one or more physical ports. The switch modules 136 are configured to switch channels, timeslots, tributary units, packets, etc. between the line modules 134. For example, the switch modules 136 can provide wavelength granularity (Layer 0 switching), OTN granularity (Layer 1 switching), Ethernet granularity (Layer 2 switching); and the like. Specifically, the switch modules 136 can include TDM (i.e., circuit switching) and/or packet switching engines. The switch modules 136 can include redundancy as well, such as 1:1, 1:N, etc. In the present disclosure, the switch modules 136 always have at least the packet switching engines.

Those of ordinary skill in the art will recognize the network element 130 can include other components which are omitted for illustration purposes, and that the systems and methods described herein are contemplated for use with a plurality of different network elements with the network element 130 presented as an example of a type of network element. For example, in another embodiment, the network element 130 may not include the switch modules 136, but rather have the corresponding functionality in the line modules 134 (or some equivalent) in a distributed fashion. For the network element 130, other architectures providing ingress, egress, and switching are also contemplated for the systems and methods described herein. In general, the systems and methods described herein contemplate use with any network element providing switching of channels, timeslots, tributary units, wavelengths, etc. and using the control plane. Furthermore, the network element 130 is merely presented as one example of network element 130 for the systems and methods described herein.

As is described herein, the present disclosure includes a TDM gateway module, which is an example line module 134 that supports one or more legacy TDM services. The present disclosure further includes a packet switch fabric, which is an example switch module 136. The TDM gateway module connects to the packet switch fabric for the transport of the legacy TDM services over a packet network and for protection of such services.

Controller

Figure 3:
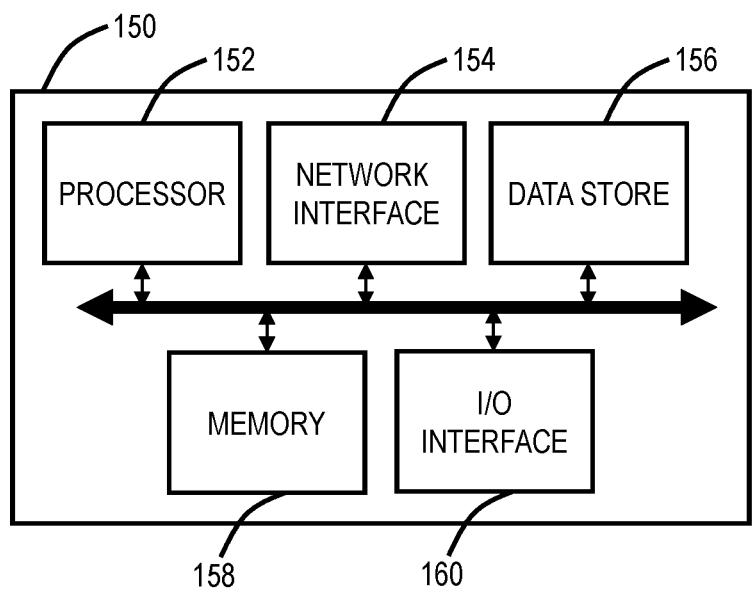
FIG. 3 is a block diagram of a controller for use with the node of FIG. 2.

FIG. 3 is a block diagram of a controller 150 to provide control plane processing and/or OAM&P for the network element 130. The controller 150 can be part of the common equipment, such as common equipment 132 in the network element 130, or a stand-alone device communicatively coupled to the network element 130 via the DCN 140. The controller 150 can include a processor 152, which is a hardware device for executing software instructions such as operating the control plane. The processor 152 can be any custom made or commercially available processor, a central processing unit (CPU), an auxiliary processor among several processors associated with the controller 150, a semiconductor-based microprocessor (in the form of a microchip or chip set), or generally any device for executing software instructions. When the controller 150 is in operation, the processor 152 is configured to execute software stored within the memory, to communicate data to and from memory 158, and to generally control operations of the controller 150 pursuant to the software instructions. The controller 150 can also include a network interface 154, a data store 156, memory 158, an I/O interface 160, and the like, all of which are communicatively coupled to one another and to the processor 152.

The network interface 154 can be used to enable the controller 150 to communicate on the DCN 140, such as to communicate control plane information to other controllers, to the management system 138, to the nodes 130, and the like. The network interface 154 can include, for example, an Ethernet card or a Wireless Local Area Network (WLAN) card. The network interface 154 can include address, control, and/or data connections to enable appropriate communications on the network 140. The data store 156 can be used to store data, such as control plane information, provisioning data, OAM&P data, etc. The data store 156 can include any of volatile memory elements, nonvolatile memory elements, and combinations thereof. Moreover, the data store 156 can incorporate electronic, magnetic, optical, and/or other types of storage media. The memory 158 can include any of volatile memory elements, nonvolatile memory elements, and combinations thereof. Moreover, the memory 158 may incorporate electronic, magnetic, optical, and/or other types of storage media. Note that the memory 158 can have a distributed architecture, where various components are situated remotely from one another but may be accessed by the processor 152. The I/O interface 160 includes components for the controller 150 to communicate with other devices. Further, the I/O interface 160 includes components for the controller 150 to communicate with the other controllers/nodes, such as using overhead associated with TDM signals.

TDM Protection Via a TDM Fabric in TDM Gateway Modules

Figure 4:
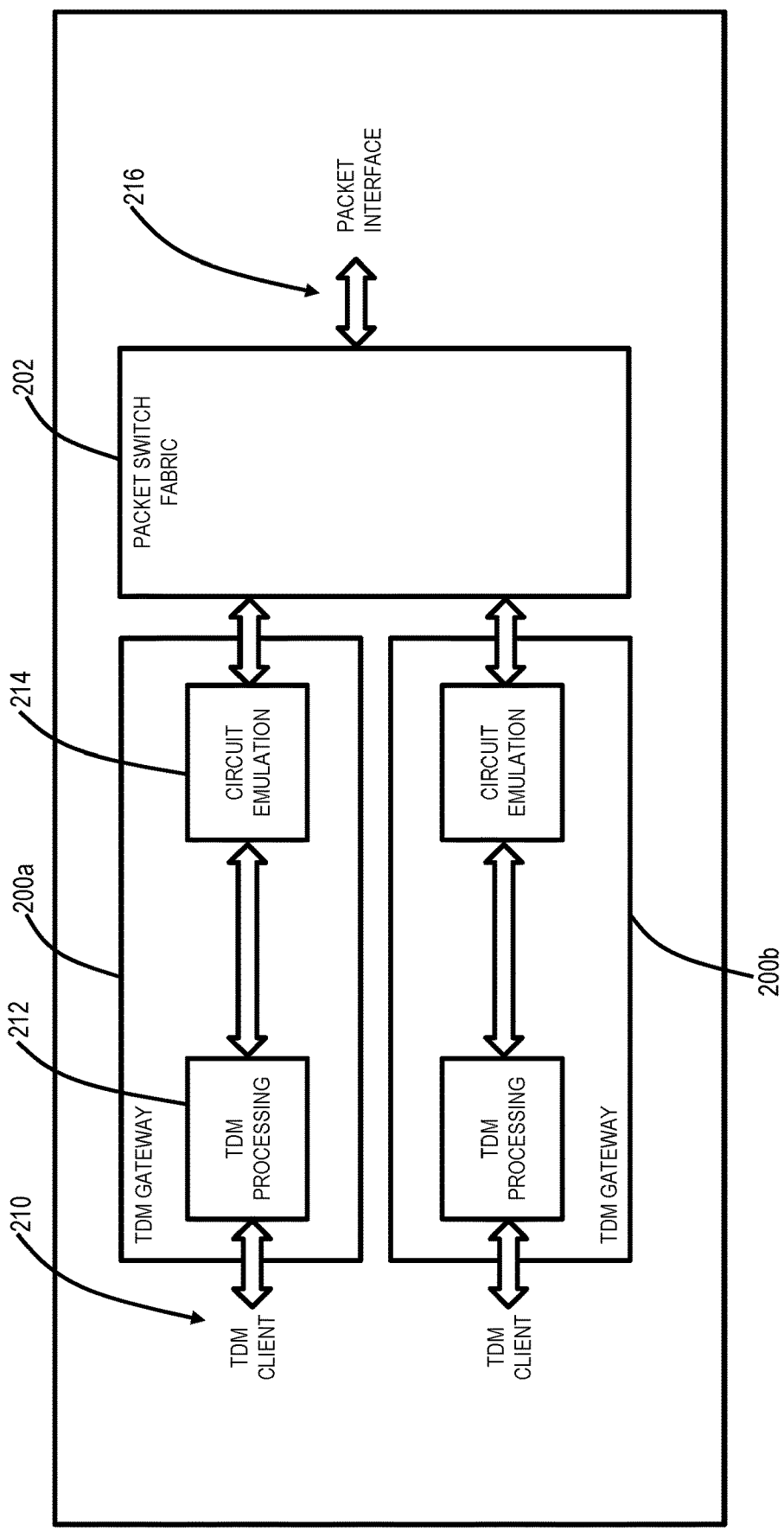
FIG. 4 is a block diagram of TDM gateway modules connected to a packet switch fabric and the associated data path.

FIG. 4 is a block diagram of TDM gateway modules 200a, 200b connected to a packet switch fabric 202 and the associated data path. Again, as described herein, the TDM gateway module 200a, 200b can be a line module 134, and the packet switch fabric 202 can be a switch module 136. The various FIGS. herein illustrate the TDM gateway modules 200 and the packet switch fabric 202 in block diagrams. Those of ordinary skill in the art will recognize these devices are realized with hardware, software, and firmware, e.g., "circuitry," to implement the associated functions. In an embodiment, the TDM gateway modules 200 and the packet switch fabric 202 can be separate modules, e.g., such as the line modules 134 and the switch modules 136. In another embodiment, the various functions can be integrated into a single module or more than two modules. In yet another embodiment, an integrated implementation may include the functionality in a "pizza box" or the like.

Traditional TDM gateway modules typically implement support for protection schemes at a per packet service level within the Packet Switched Fabric. This data path is illustrated in FIG. 4. Here, in FIG. 4, there are two TDM gateway modules 200a, 200b each interconnected to a packet switch fabric 202. Each TDM gateway modules 200a, 200b each include a TDM client interface 210, i.e., an input/output connection such as a coaxial cable, CAT5/CAT6 cable, optical fiber, etc. The TDM client interface 210 connects to TDM processing circuitry 212, which connects to circuit emulation circuitry 214. The circuit emulation circuitry 214 connects to the packet switch fabric 202 which has a packet interface 216. The TDM processing circuitry 212 is configured to perform SONET/SDH Operations, Administration, Maintenance, and Provisioning (OAM&P) functions. For example, the TDM processing circuitry 212 can process SONET/SDH overhead. The circuit emulation circuitry 214 is configured to provide packetized TDM traffic into a packet flow. In this example, the two TDM client interfaces 210 can provide protected TDM services over the packet interface 216.

Note, in the example of FIG. 4, each of the TDM payloads from the TDM client interface 210 of each of the TDM gateway modules 200a, 200b is packetized and provided to the packet switch fabric 202, i.e., both the working and protection lines for a TDM service are sent in the packet network.

Attempting to mimic this protection functionality at the packet service layer (i.e., individual packetized SONET or SDH payloads) in the packet switch fabric 202 presents various issues. First, there is the complexity of providing a feature set consistent with existing TDM solutions which require selecting traffic from one of two different end-points and broadcasting traffic to two different end-points. Second, there are issues supporting a low latency data path for TDM traffic passing through a node. Third, there are issues supporting consistent switch times as the number of services increases. Finally, there are issues maximizing the limited number of individual packet services that can be supported by the packet switch fabric 202.

The TDM gateway modules 200a, 200b can be in a 1:1 or 1+1 equipment protection configuration, arranged in a Working/Protection or Active/Standby pair. The working module 200a is normally used to forward the data associated with the TDM clients to the packet switch fabric 202. A switch from the working module 200a to the protection module 200b (i.e., the protection card is now used to forward data) can be the result of equipment failure of the working card, an ingress client failure, or a user request.

Figure 5:
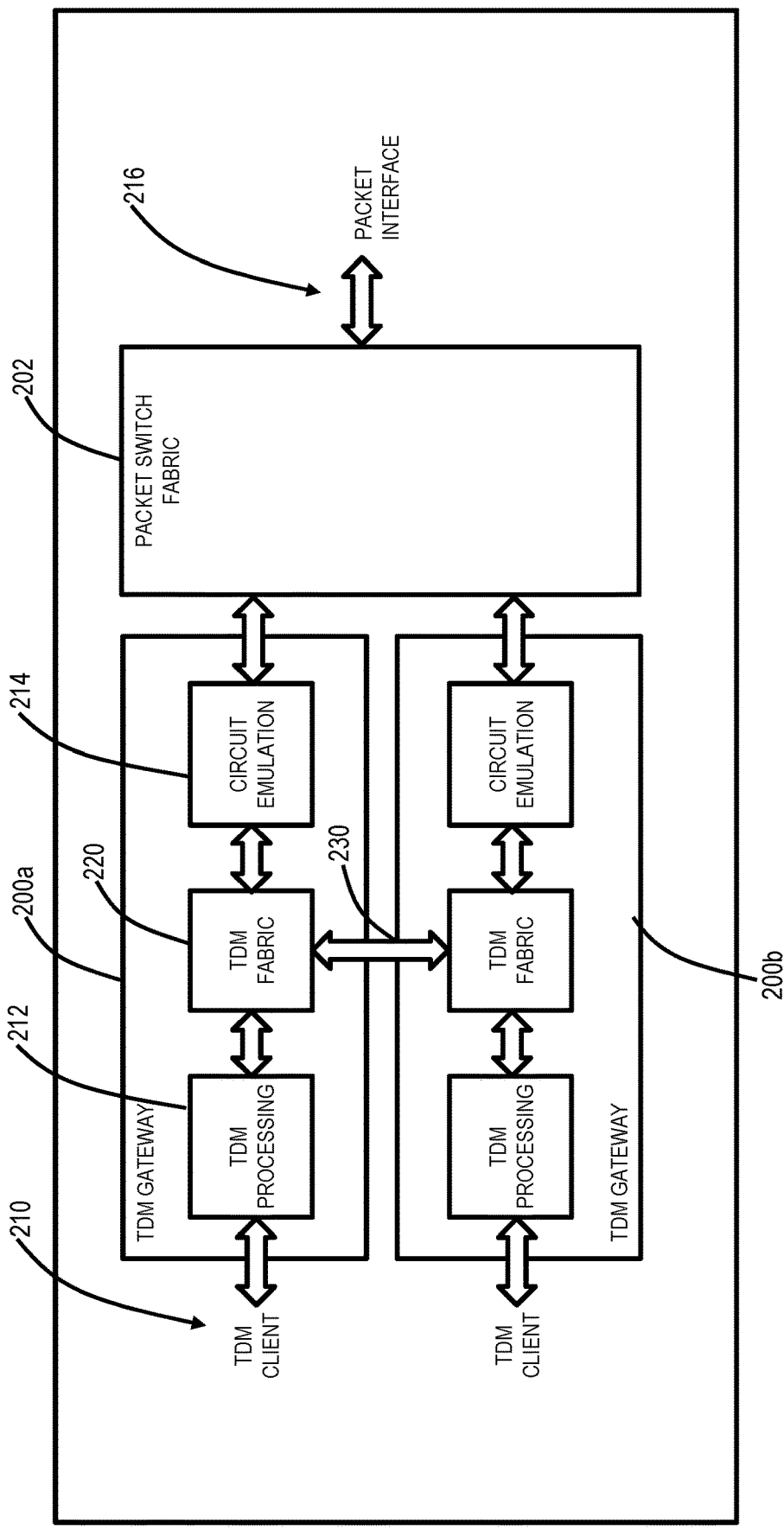
FIG. 5 is a block diagram of TDM gateway modules connected to a packet switch fabric with a TDM fabric.

FIG. 5 is a block diagram of TDM gateway modules 200a, 200b connected to a packet switch fabric 202 with a TDM fabric 220. The systems and methods simplify the support of facility protection in a packet-based network element and address the above issues by utilizing the TDM fabric 220 to implement the TDM line, path, or ring protection ahead of a circuit emulation circuitry 214 that launches packetized TDM traffic into a cascaded packet fabric as illustrated in FIG. 5. The TDM fabric 220 can be circuitry configured to process and switch TDM signals.

With the presence of the TDM fabric 220, well-understood hardware and software techniques used in TDM network elements can be used to support TDM path selection allowing each TDM client interface 210 to be individually protected, accelerate or automate the path selection based on fault or status information, and broadcast TDM paths as required for different TDM configurations.

Furthermore, without the TDM Fabric 220, both TDM paths in each of the TDM gateway modules 200a, 200b would need to be packetized and forwarded to the packet switch fabric 202, as in FIG. 4. This doubles the number of packet services that need to be supported by the packet switch fabric 202 and impacts the total number of TDM services that could ultimately be supported by a network element as the packet switch fabric 202 has both hardware and software limits on the total number of packet services that can be supported. Additionally, complex provisioning operations are required to select between the two packet services when a protection switch occurs.

With the presence of the TDM fabric 220, which allows TDM path selection in the TDM domain, the packet switch fabric 202 need only be aware of a single packet service thus optimizing the use of the limited number of packet services and removing the need to support complex provisioning operations during a switch. Note, the TDM fabrics 220 on each TDM gateway module 200a, 200b can be communicatively coupled to one another such as via a links 230 over the backplane or the like. This links 230 can be used to coordinate which of the TDM fabrics 220 should send a working line to the packet switch fabric 202. Further, the links 230 can be used to switch TDM services between the gateway modules 200a, 200b, independent of the packet switch fabric 202. Note, while the examples here show two gateway modules 200a, 200b, those of ordinary skill in the art will appreciate there can be more than two with each of the gateway modules 200 interconnected via the links 230.

Figure 6:
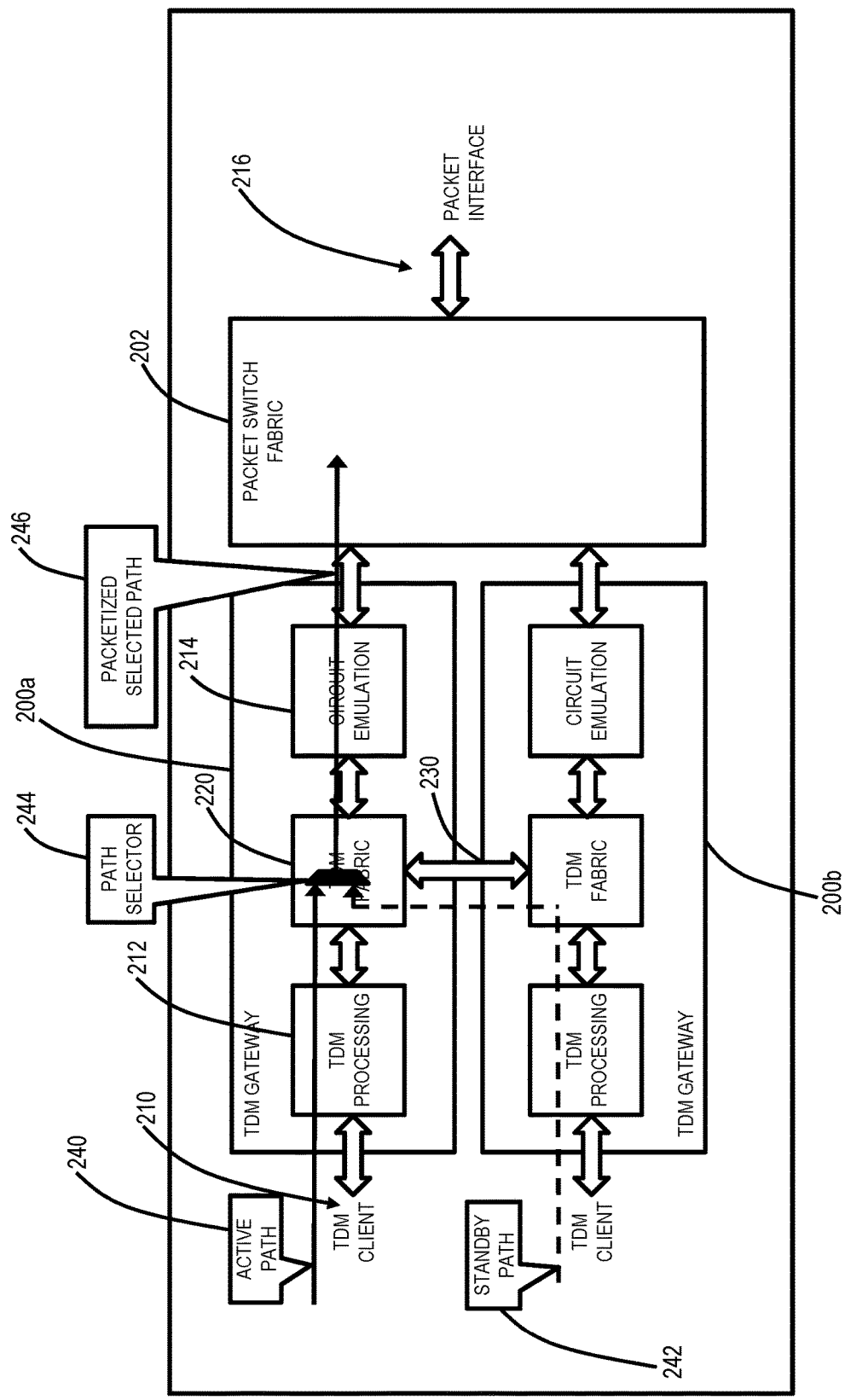
FIG. 6 is a block diagram of TDM gateway modules connected to a packet switch fabric for ingress TDM path selection.

FIG. 6 is a block diagram of TDM gateway modules 200a, 200b connected to a packet switch fabric 202 for ingress TDM path selection Specifically, utilizing the TDM fabric 220, TDM path selection is illustrated in FIG. 6. The TDM client interface 210 on the TDM gateway module 200a includes an active path 240 for a TDM signal and the TDM client interface 210 on the TDM gateway module 200b includes a standby path 242 for the TDM signal. The active path 240 connects from the TDM client interface 210 to the TDM processing circuitry 212 to the TDM fabric 220 on the TDM gateway module 200a. The standby path 242 connects from the TDM client interface 210 to the TDM processing circuitry 212 to the TDM fabric 220 on the TDM gateway module 200b, and then to the TDM fabric 220 on the TDM gateway module 200a via the link 230.

In an ingress direction, both the active path 240 and the standby path 242 arrive at the TDM fabric 220 where a path selection 244 is made, and the selected path is then forwarded to the circuit emulation circuitry 214 where the selected path 246 is packetized and forwarded to the packet switch fabric 202. That is, on the packetized selected path 246 is sent to the packet switch fabric 202, not both. Note that while the path selection 244 is illustrated as occurring in the upper TDM gateway module 200a, it could easily be implemented in the lower TDM gateway module 200b as well.

Also, which TDM fabric 220 performs the path switching operation can be realized in either an exclusive (i.e., only one TDM fabric 220) or parallel (both TDM fabrics 220) arrangement. In FIG. 6, both the paths 240, 242 are brought to one TDM fabric 220 (here, in the TDM gateway module 200a). In another embodiment, both the paths 240, 242 are brought to the other TDM fabric 220, i.e., in the TDM gateway module 200b. In yet another embodiment, the paths 240, 242 may not traverse the link 230, but rather a status or some other control signal is provided over the link 230 that may be used determine which TDM fabric 220 in which TDM gateway module 200a, 200b sends the packetized selected path 246 to the packet switch fabric 202. Another embodiment has both paths 240, 242 being brought to both switches. The path selection is then done in both switches in parallel but only one TDM gateway card forwards the packedized traffic to the packet switch fabric. The control signals over link 230 determine which packet fabric forwards the packetized data to the packet switch fabric.

Figure 7:
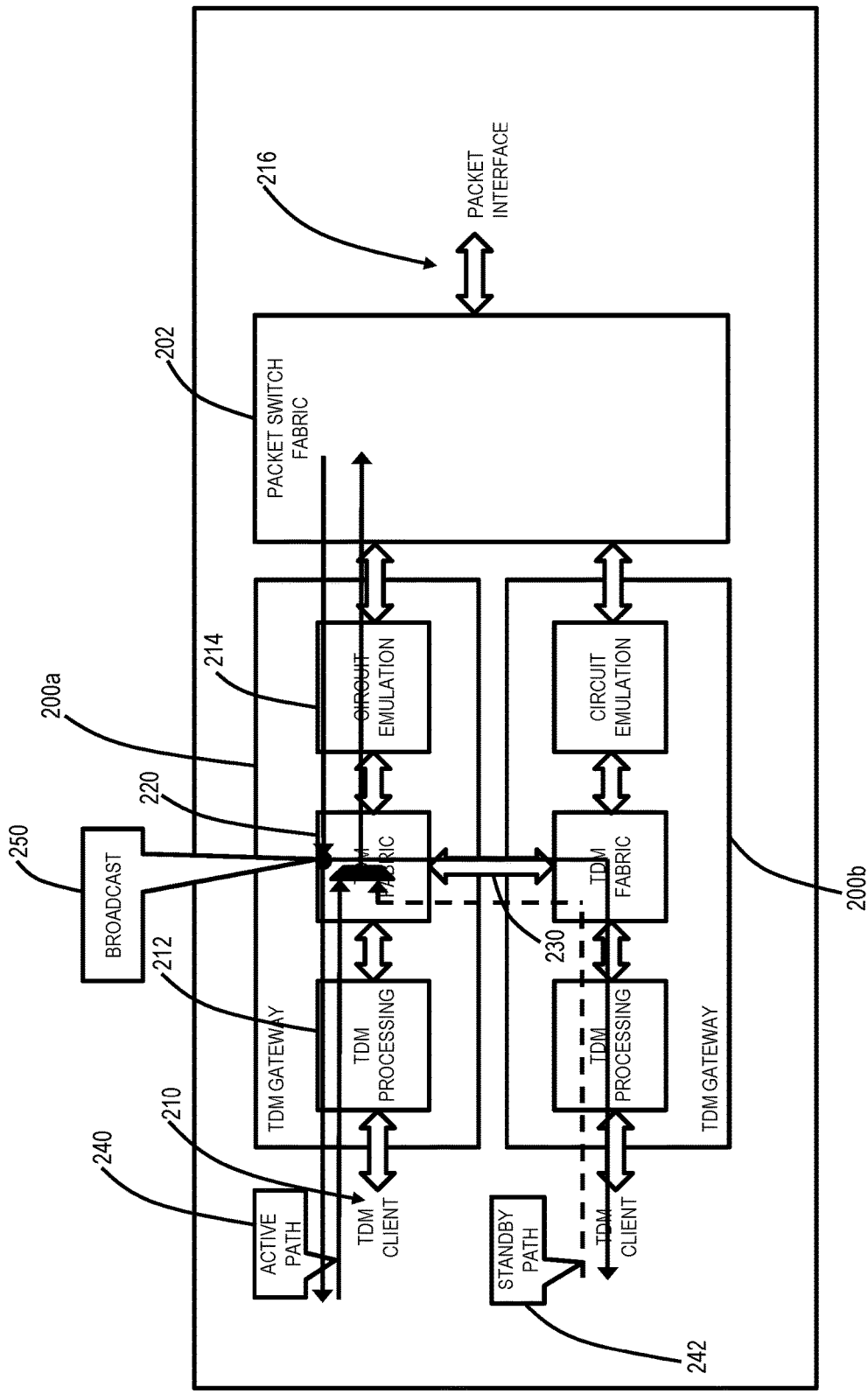
FIG. 7 is a block diagram of TDM gateway modules connected to the packet switch fabric ingress TDM path selection with egress TDM path broadcast.

FIG. 7 is a block diagram of TDM gateway modules 200a, 200b connected to the packet switch fabric 202 for ingress TDM path selection with egress TDM path broadcast. In the egress direction, the TDM fabric 220 is used to broadcast 250 the reconstituted TDM payload to both the active and standby paths 240, 242 as illustrated in FIG. 7. Implementing the broadcast 250 in the TDM domain via the TDM fabric 220 alleviates the use of the broadcast functionality in the packet switch fabric 202 which is typically limited.

Figure 8:
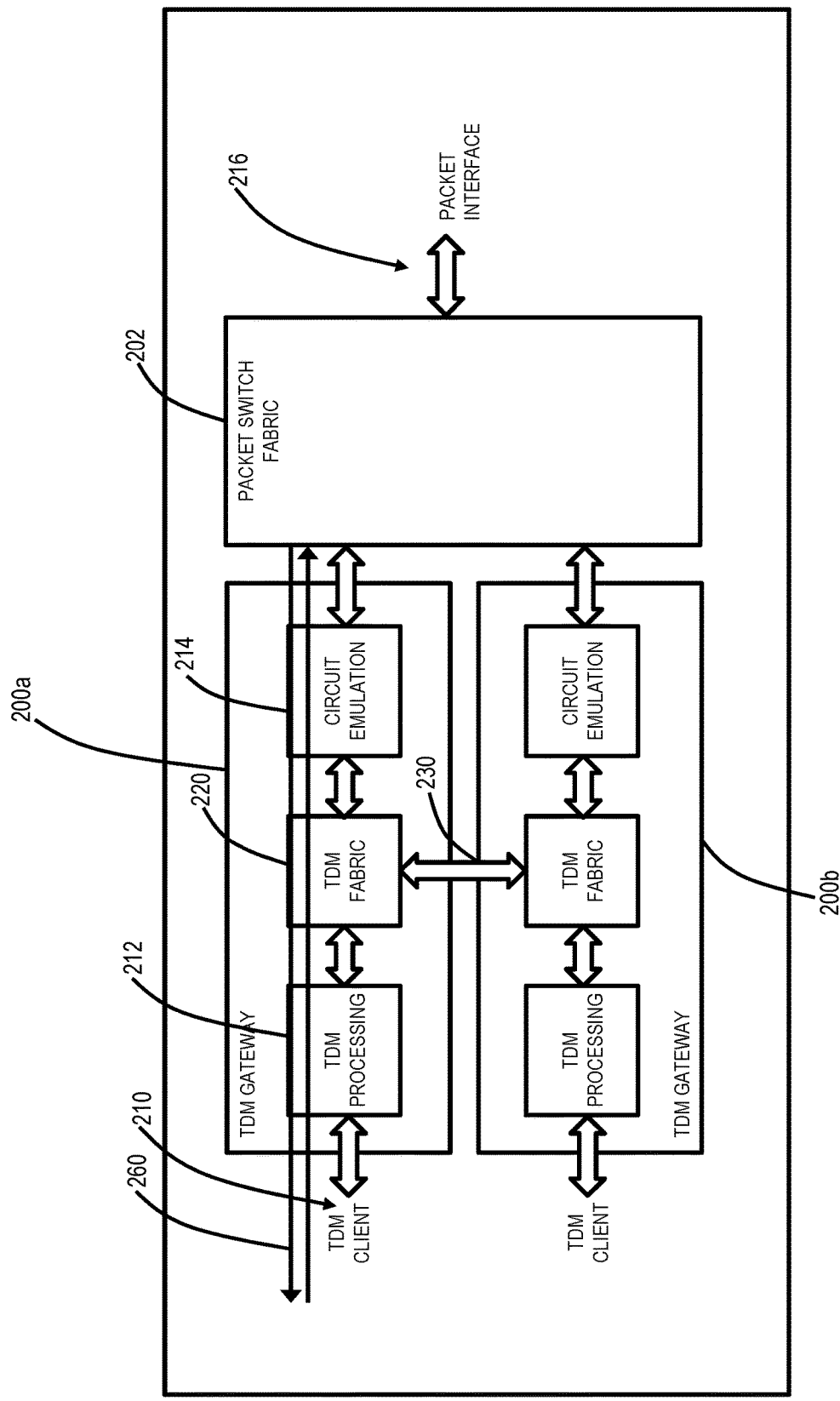
FIG. 8 is a block diagram of TDM gateway modules connected to the packet switch fabric for an unprotected TDM path.

FIG. 8 is a block diagram of TDM gateway modules 200a, 200b connected to the packet switch fabric 202 for an unprotected TDM path 260. Unprotected traffic simply passes through the TDM fabric 220 with no path protection as illustrated in FIG. 8.

Figure 9:
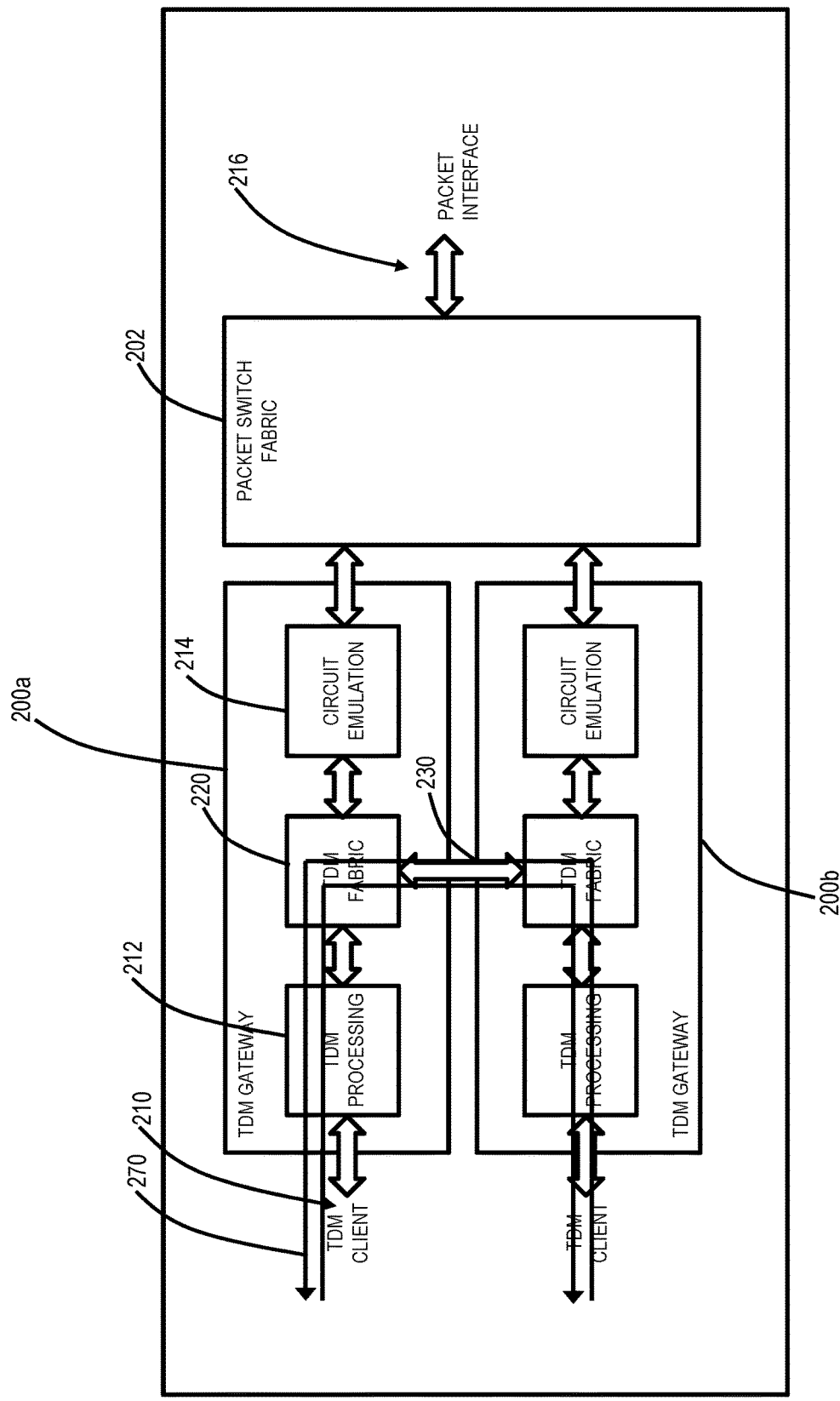
FIG. 9 is a block diagram of TDM gateway modules connected to the packet switch fabric for a passthrough TDM path.

FIG. 9 is a block diagram of TDM gateway modules 200a, 200b connected to the packet switch fabric 202 for a passthrough TDM path 270. Traffic that is meant to pass through a node can do so within the TDM fabric 220 as illustrated in FIG. 9. Here, the two TDM client interfaces 210 on each of the TDM gateway modules 200a, 200b are interconnected via the TDM fabrics 220 and the link 230. Ensuring passthrough traffic remains solely in the TDM domain eliminates the significant latency penalties associated with packetizing the TDM traffic and having it pass through the packet switch fabric 202. This is especially important in TDM ring configurations in which the TDM payload could pass through several TDM gateway modules 200.

Through the use of the above-mentioned features, the TDM fabric 220 in this configuration can be used to isolate the packet switch fabric 202 from the complexities of supporting traditional SONET and SDH TDM facility protection mechanisms such as Automatic Protection Switching (APS)/Multiplex Section Protection (MSP) line, Unidirectional Path-Switched Rings (UPSR)/Subnetwork Connection Protection (SNCP) path and Bidirectional Line-Switched Rings (BLSR)/Multiplex Section-Shared Protection Ring (MS-SPRing) rings. That is, APS/MSP line and UPSR/SNCP/BLSR/MS-SPRing ring protection mechanisms are performed through the TDM fabric 220.

TDM Equipment Protection with a LAG in a Packet Switch Fabric

In the embodiments of FIGS. 5-9, TDM equipment protection is performed via the TDM fabric 220 in the TDM gateway modules 200. In another embodiment, illustrated in FIGS. 10-14, TDM equipment protection can be performed via an internal LAG group in the packet switch fabric 202. Specifically, equipment protection of all services on a TDM gateway module 200 can be carried out through the reconfiguration of a single LAG group which is independent of the number of services, ensuring consistent switch times which meet applicable standards. Only the active TDM traffic is circuit emulated and forwarded to the packet switch fabric 202 thus maximizing the use of the total number of packet services supported by the packet switch fabric 202. This avoids the need for a co-located subtended TDM network element which saves both capital and operating costs. Further, the elimination of the subtended TDM network element also removes concerns related to interconnect and single points of failure between the TDM network element and the packet network element.

Link aggregation applies to combining (aggregating) multiple network connections in parallel in order to increase throughput beyond what a single connection could sustain and to provide redundancy in case one of the links should fail. A LAG combines a number of physical ports together to make a single high-bandwidth data path, so as to implement the traffic load sharing among the member ports in the group and to enhance the connection reliability.

Figure 10:
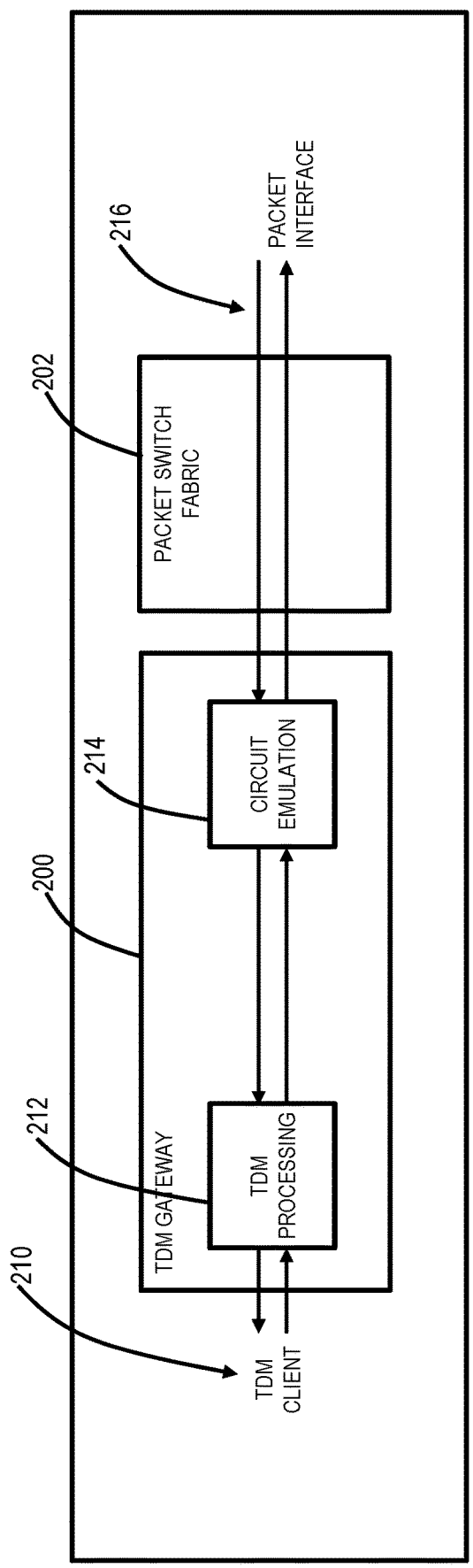
FIG. 10 is a block diagram of a TDM gateway module, a packet switch fabric, and the associated data path.

FIG. 10 is a block diagram of a TDM gateway module 200, a packet switch fabric 202, and the associated data path. TDM client traffic from the TDM client interface 210 is processed by the TDM processing circuitry 212 and the individual Plesiochronous Digital Hierarchy (PDH), SONET, or SDH payloads are packetized via the circuit emulation circuitry 214 and forwarded to the packet switch fabric 202 over an Ethernet interface that is internal to the network element. As described herein, the TDM gateway module 200 can be a line module 134, and the packet switch fabric 202 can be a switch module 136.

Figure 11:
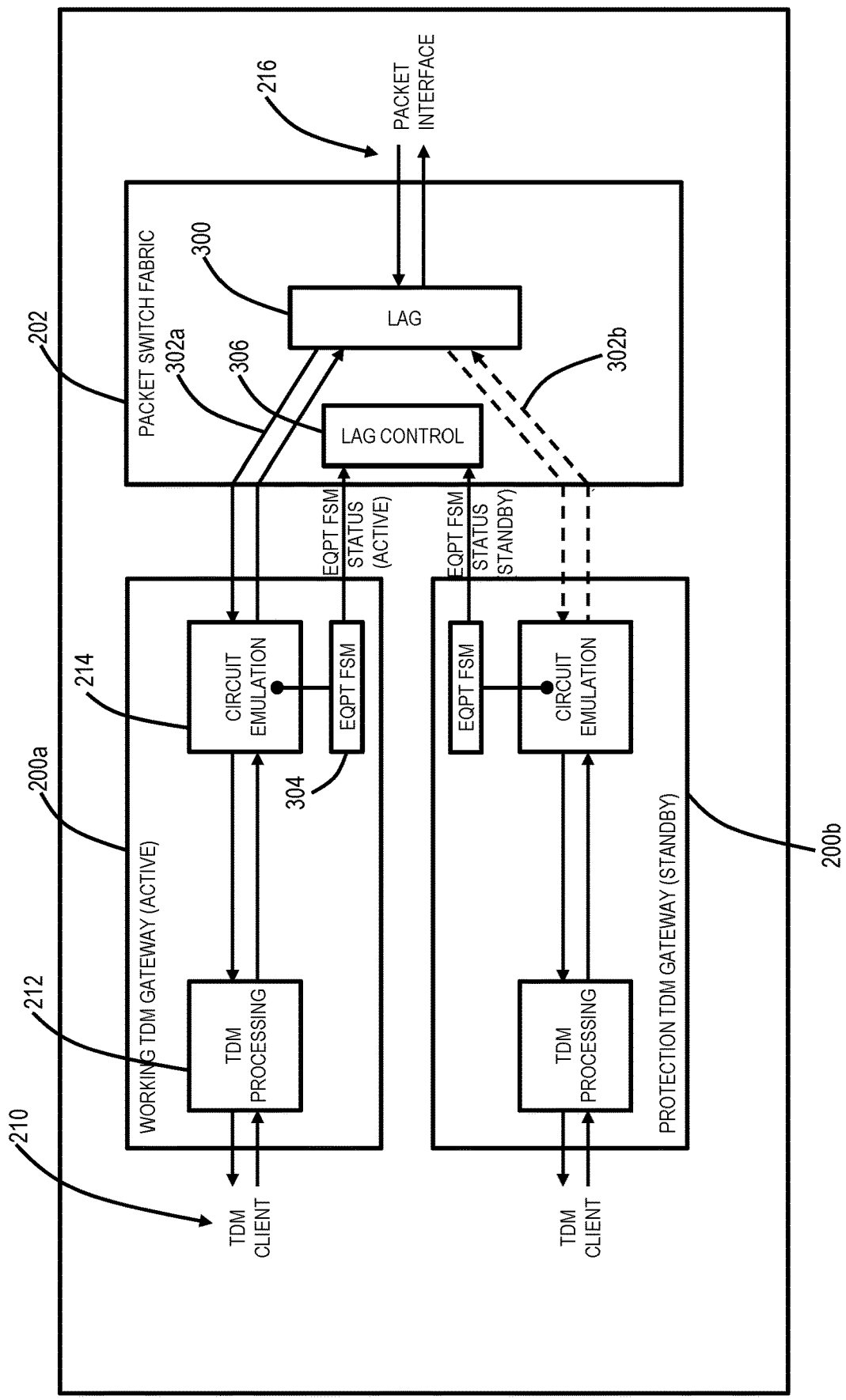
FIG. 11 is a block diagram of two TDM gateway modules connected to a packet switch fabric in a 1:1 or 1+1 equipment protection configuration.

FIG. 11 is a block diagram of two TDM gateway modules 200a, 200b connected to a packet switch fabric 202 in a 1:1 or 1+1 equipment protection configuration. Again, in a 1:1 or 1+1 equipment protection configuration, two TDM gateway modules 200a, 200b are required and arranged in a Working/Protection or Active/Standby pair. The working module is normally used to forward the data associated with the TDM clients to the packet switch fabric 202. A switch from the working module to the protection module (i.e., the protection module is now used to forward data) can be the result of equipment failure of the working module, an ingress client failure, or a user request. FIG. 11 also illustrates a LAG configuration.

Relevant Telcordia and ITU-T standards specify that a switch to the protection module 200b should be completed in under 50 ms. This can be difficult to achieve in a packet-based network element depending upon how the functionality is implemented. For example, as each TDM payload will result in an individual packet service, attempting to perform the equipment switch by reconfiguring each individual packet service does not easily scale to a large number of services. In other words, the protection switch times will increase as the number of services increases, which are especially problematic on a high density TDM gateway module 200 in which thousands of TDM payloads can be processed.

Figure 12:
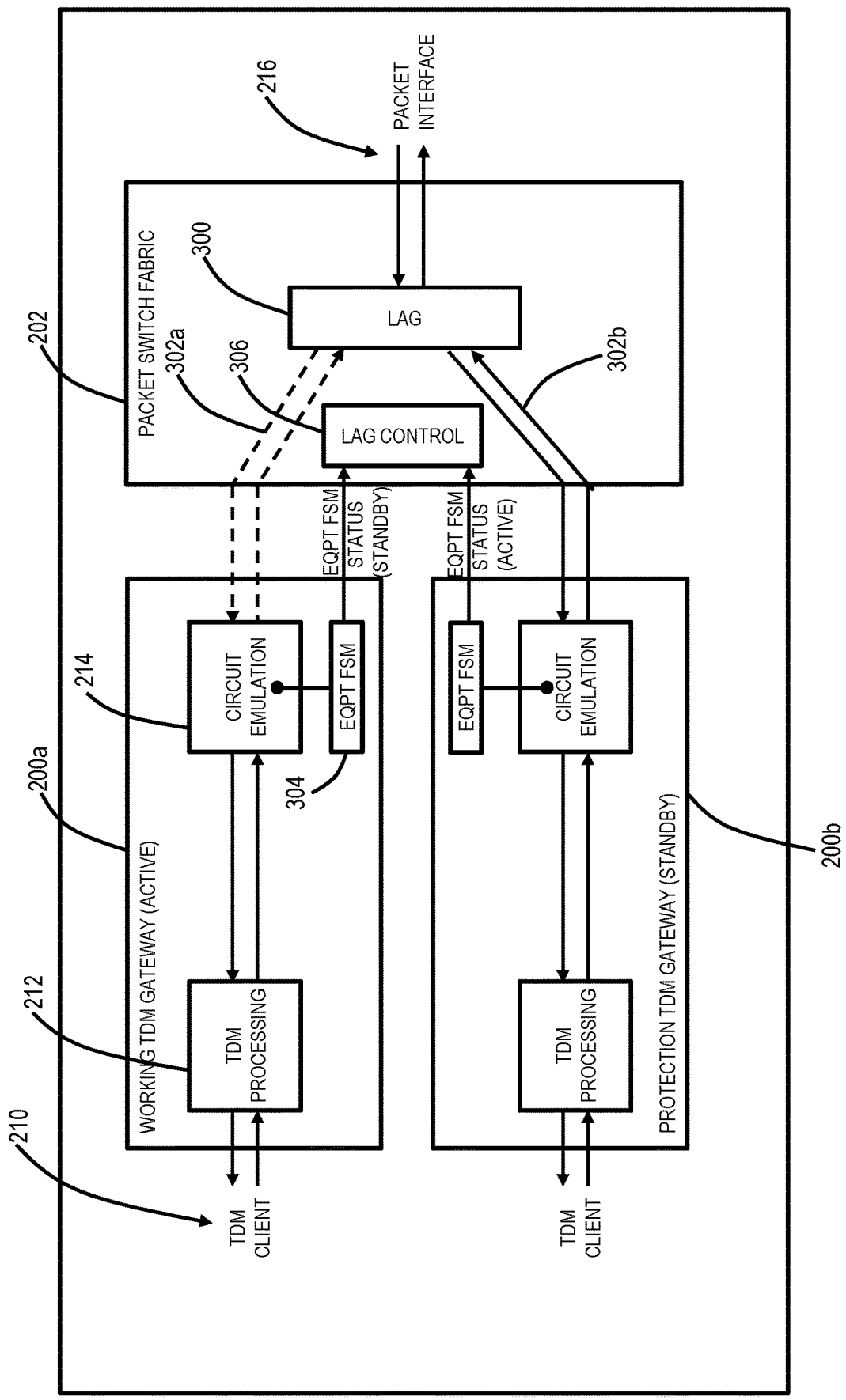
FIG. 12 is a block diagram of a Link Aggregation Group (LAG) configuration for 1:1 or 1+1 equipment protection and a switch to the protection TDM gateway module.

FIG. 11 is a block diagram of two TDM gateway modules 200a, 200b connected to a packet switch fabric 202 in a 1:1 or 1+1 equipment protection configuration. FIG. 12 is a block diagram of a LAG configuration for 1:1 or 1+1 equipment protection and a switch to the protection TDM gateway module 200b. The systems and methods address this protection switch time versus service scaling issue by using a LAG 300 an internal Ethernet interface between the packet switch fabric 202 and the working and protection TDM gateway modules 200a, 200b. The packet switch fabric 202 can implement the LAG 300 with two legs or members 302a, 302b, one for each TDM gateway module 200a, 200b in the protection pair.

The use of the LAG 300 allows for switching of the entire data path from one TDM gateway module 200a to the other TDM gateway module 200b via the reconfiguration of the LAG 300. In other words, when an equipment switch is required, the only operation required on the packet switch fabric 202 is to reconfigure the LAG 300. No configuration or provisioning operations are required at the service level, meaning the time required to execute the protection switch is independent of the number of provisioned services. The LAG 300 group both collects and distributes traffic only to the active TDM gateway module 200a, 200b. In FIG. 10, this is designated as the "Working—TDM Gateway (Active)" module, i.e., the TDM gateway module 200a. The leg 302b connected to the protection (or standby) module 200b is configured but is disabled as the protection module 200b is not active.

Furthermore, the use of a LAG group alleviates the need for the packet switch fabric 202 to process individual services from both the working and protection modules 200a, 200b at the same time. Instead, the packet switch fabric 202 to needs only to be provisioned with a single packet service for each packetized TDM service thus optimizing the use of the packet service resources available on the packet switch fabric 202 to. This, in turn, increases the number of packetized TDM services that can be supported.

Control of which leg in the LAG is active is accomplished via a Finite State Machine (FSM) 304 which is shared between the two TDM gateway modules 200a, 200b and which connects to LAG control 306 on the packet switch fabric 202. The status of the FSM 304 controls which TDM gateway module 200a, 200b is actively forwarding traffic and notifies the packet switch fabric 202 as to which leg 302a, 302b in the LAG 300 should be used. The use of the FSM 304 and the LAG control 306 also allows the 1:1 or 1+1 protection engine (i.e., software) to reside on the TDM gateway module 200a, 200b which serves to both keep the packet switch fabric 202 isolated from the TDM functionality and also distribute the 1:1 and 1+1 workload to multiple TDM gateway modules 200a, 200b.

Figure 13:
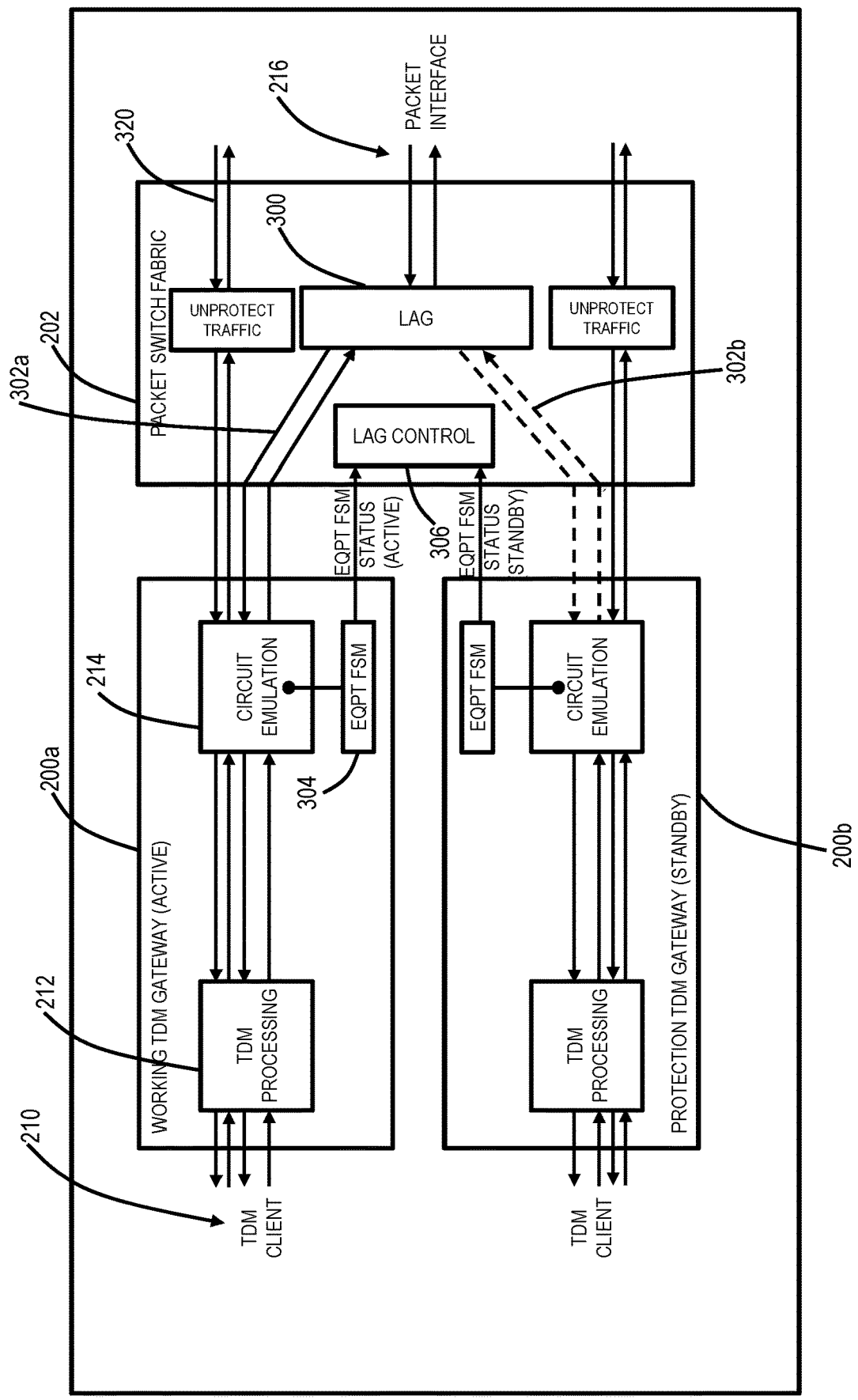
FIG. 13 is a block diagram of the LAG used in parallel with non-LAG packet streams from the TDM gateway modules.

FIG. 13 is a block diagram of the LAG 300 used in parallel with non-LAG packet streams 320 from the TDM gateway modules 200a, 200b. The LAG 300 can be used in parallel with the non-LAG packet streams 320 from the TDM gateway modules 200a, 200b allowing for a combination of protected and unprotected TDM payloads to be supported with the same TDM gateway modules 200a, 200b.

The systems and methods support 1:1 and 1+1 equipment protection for any TDM gateway module 200a, 200b supporting PDH, SONET, and/or SDH clients, as illustrated in FIGS. 11-13. It is also extensible to support 1:N equipment protection configurations in which up to N×working TDM gateway modules 200-1, 200-2, 200-3 are protected by a single protection TDM gateway module 200p.

Figure 14:
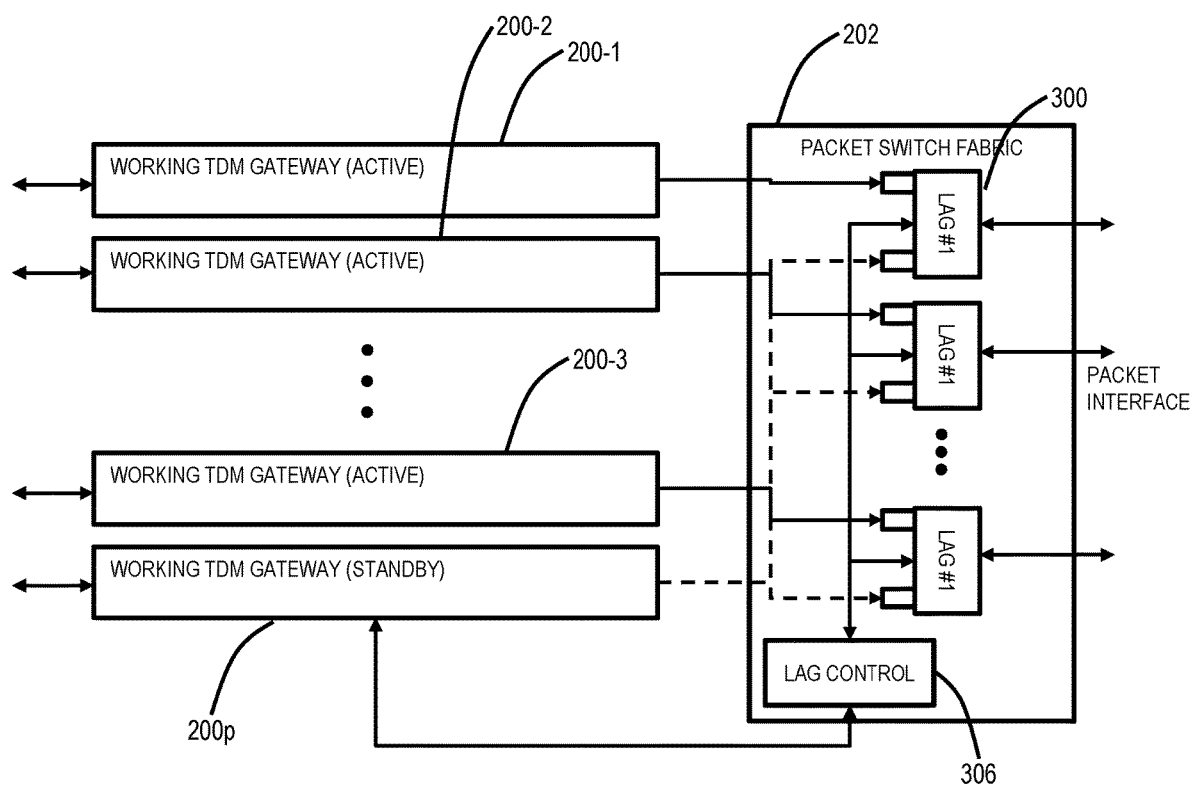
FIG. 14 is a block diagram of multiple TDM gateway modules for 1:N equipment protection.

FIG. 14 is a block diagram of multiple TDM gateway modules 200-1, 200-2, 200-3, 200p for 1:N equipment protection. In a 1:N configuration, a LAG group is created for each working TDM gateway module 200-1, 200-2, 200-3. Each LAG has one leg connected to the corresponding working TDM gateway module 200-1, 200-2, 200-3 and the other leg connected to the designated protection TDM gateway module 200p. Equipment protection is handled in an identical fashion to the 1:1 or 1+1 configuration in that a switch from a given working TDM gateway module 200-1, 200-2, 200-3 to the protection TDM gateway module 200p only requires the corresponding LAG 300 to be reconfigured. In a 1:N configuration, each LAG group is under the direct control of the designated protection TDM gateway module 200-1, 200-2, 200-3 which notifies the packet switch fabric 202 which leg or member of a given LAG 300 is active.

Distributed I/O module

Another aspect of legacy TDM services is they can require electrical interfaces. In an embodiment, the present disclosure includes a distributed I/O module that provides high-density support of electrical interface signals such as DS1, DS3, E1, E3, EC1, etc. on current, modern Transport or Packet Data network elements which were not designed to accommodate the copper cable management or central office installation requirements associated with these interfaces.

The distributed I/O module functions as an active I/O module, which provides the flexibility to implement both analog and digital functionality within the module. The distributed I/O module has digital interconnect supporting multiple multiplexed client signals and eliminates the need for high-density faceplate terminations. This increases the density of electrical signals that can be supported by a tributary card and increases the distance the distributed I/O module can be located away from the network element it is connected to.

The distributed I/O module a) includes a CAT 5/6 interconnect which is compatible with existing network element cable management; b) supports external Light Emitting Diode (LED) indicators to aid in central office troubleshooting, appears in shelf inventory to allow easier customer tracking; c) supports 1+1, 1:1 and 1:N electrical protection configurations with no external Y-cable or impact to electrical interface reach; d) is powered via interconnect eliminating the need for dedicated external power; e) has lower power consumption than full network element solution; f) is passively cooled which is less complex with less chance of failure due to a lack of fans; g) can be managed as a sub-slot/plug-in module of the tributary card; and h) has lower complexity and lower cost than a full network element solution.

Cable management is accomplished through the use of specific features or areas on a network element that ensures the fibers or cables associated with a given tributary module or slot do not interfere with the access to adjacent tributary cards or common equipment in the network element. Preventing interference with these components is essential to allow for easy user maintenance operations such as the removal and replacement of a specific tributary module without having to impact the data being carried on adjacent tributary cards. The support of legacy electrical interfaces requires careful consideration of the cable management issues that arise from terminating a large number of these interfaces in a high-density application.

Figure 15:
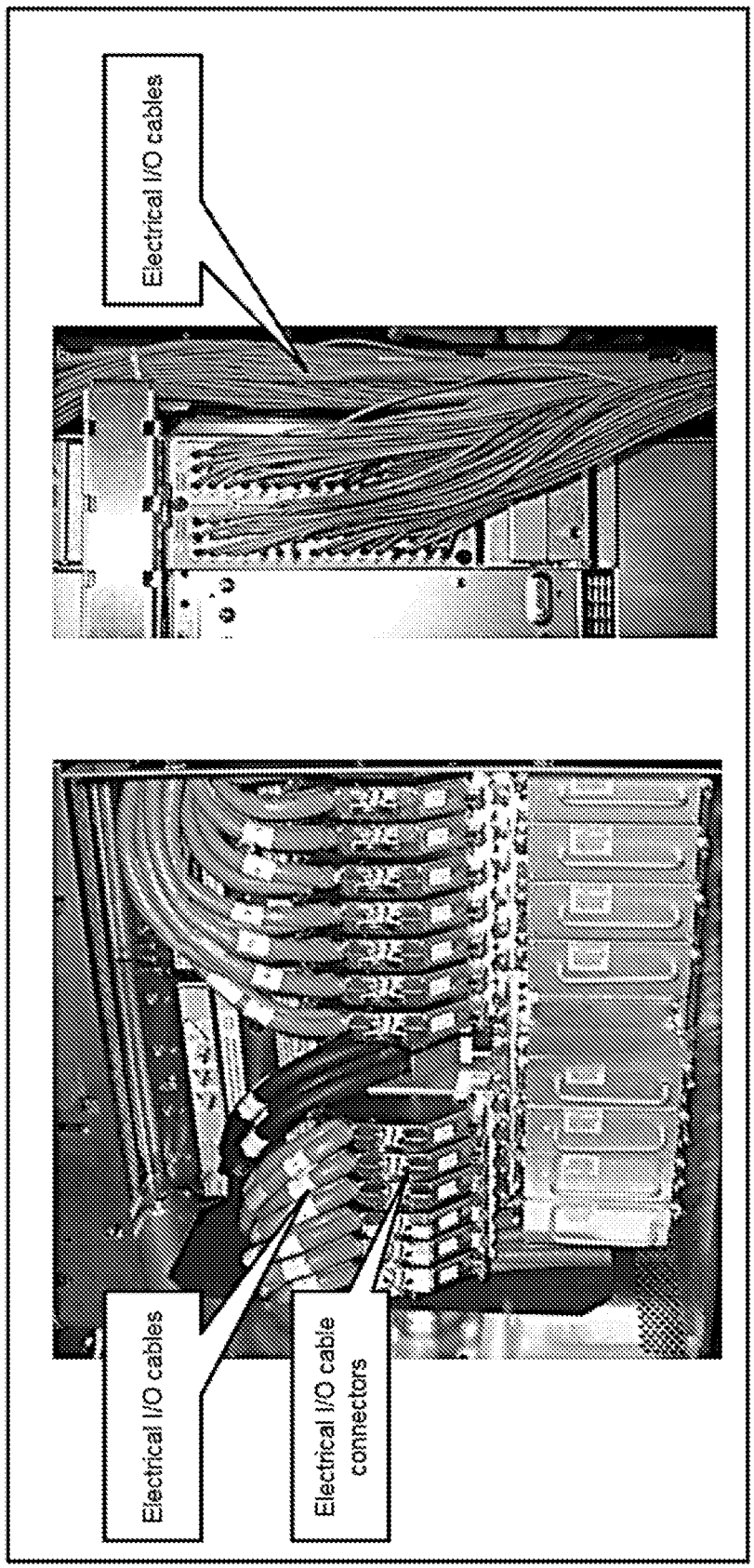
FIG. 15 is a diagram of electrical Input/Output (I/O) cable installations.

The cables associated with these legacy interfaces are quite large when compared to optical fibers or CAT 5/6 cables that are typically associated with modern Transport or Packet Data network elements. Two typical electrical I/O cable installations are shown in FIG. 15 which is a diagram of the electrical I/O cable installations.

Figure 16:
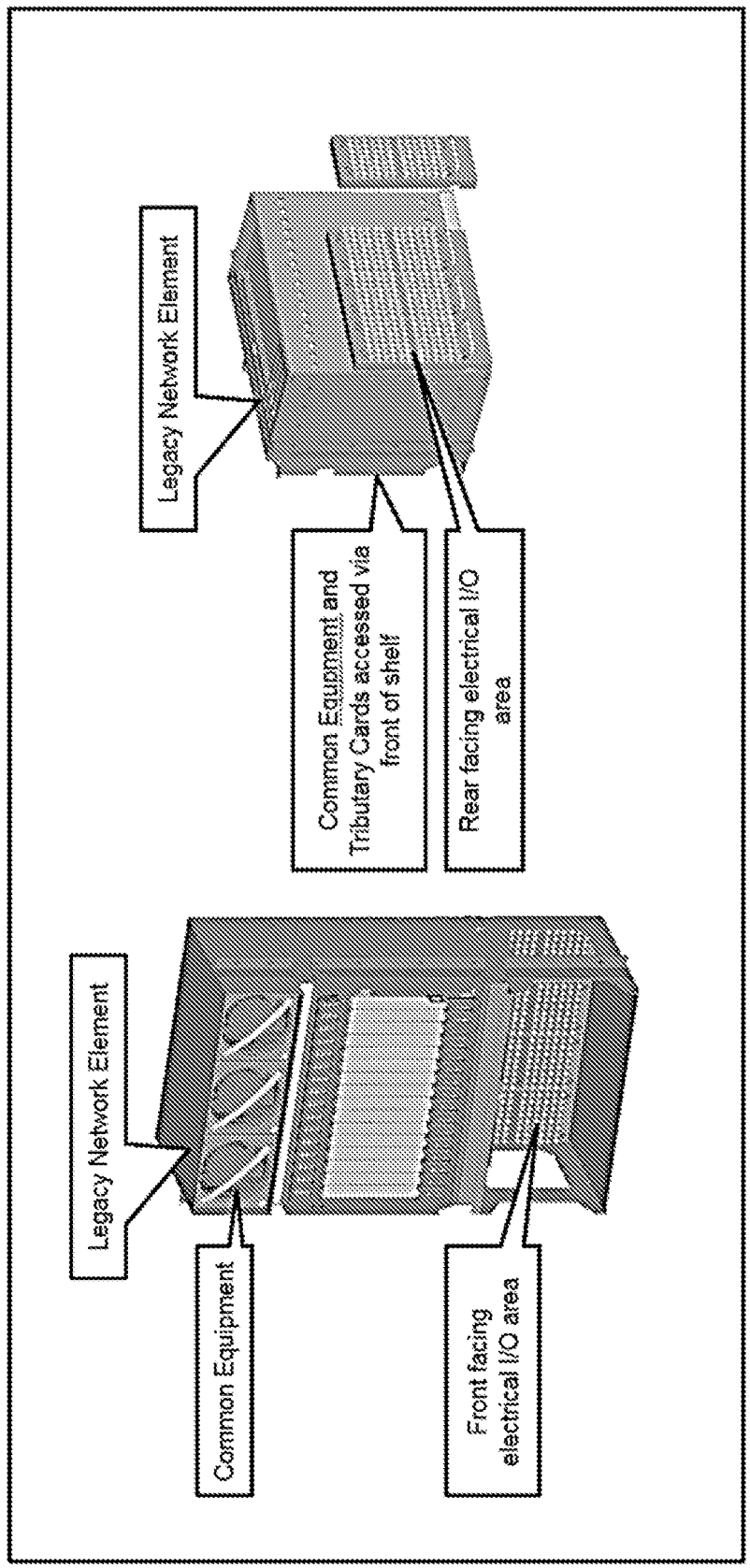
FIG. 16 is a diagram of legacy transport equipment electrical I/O locations.

Legacy Transport equipment was specifically designed to accommodate a high density of these electrical interfaces through the use of dedicated I/O areas which allowed for the termination of the associated copper cabling away from the tributary cards or common equipment of the network element. An illustration of these design features for dedicated I/O areas is shown in FIG. 16 which is a diagram of legacy transport equipment electrical I/O locations. Additionally, the legacy network elements also allowed for front or rear termination of the cables as different customers have different installation requirements.

Modern Transport or Packet Data network elements typically utilize tributary cards which support termination of fibers or CAT 5/6 cables directly on the faceplate of the tributary card. As a result, these network elements provide fiber or cable management features which allow for management of multiple fiber optic cables or CAT5/5e/6 cables per slot or tributary card supported. There are two issues that arise when attempting to design a tributary card which supports legacy electrical I/O interfaces for these modern network elements. First, there is typically insufficient faceplate area on the circuit pack to accommodate a high density of electrical interfaces which results in a lower number of interfaces than could typically be supported by the circuit pack. Second, as the large copper cable cannot be accommodated in the existing cable or fiber manager solutions, the cable will interfere with the removal or insertion of adjacent equipment in the chassis.

Figure 17:
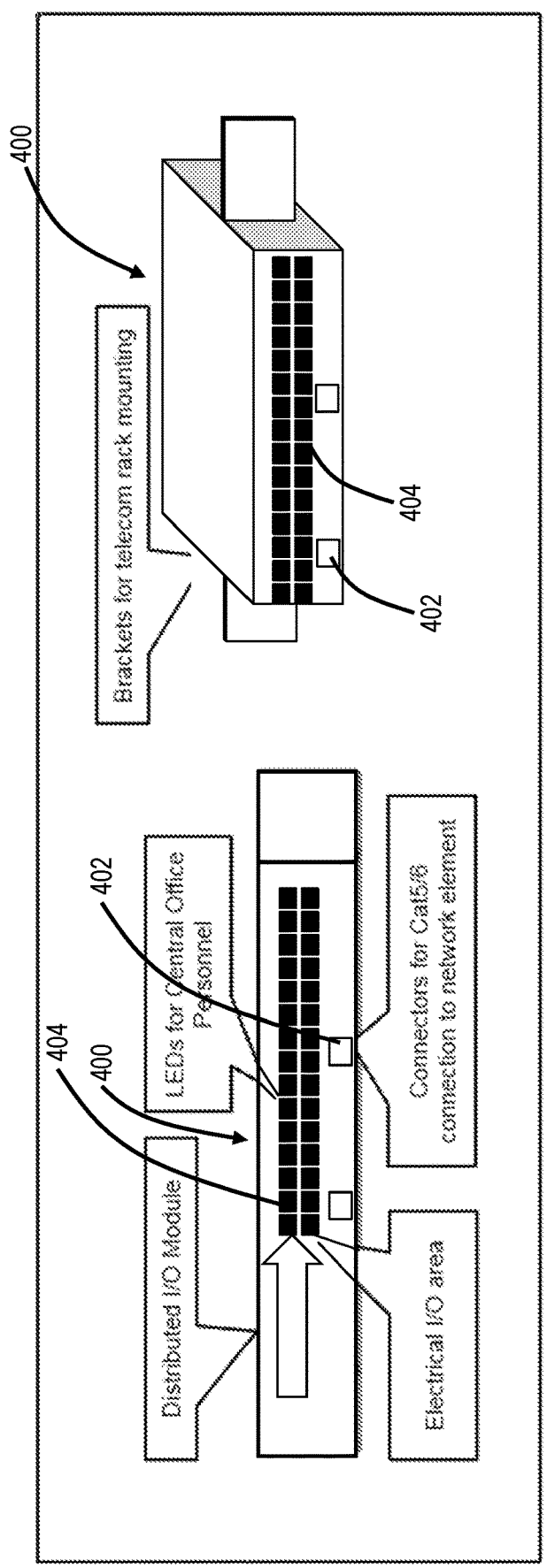
FIG. 17 is a diagram of a distributed I/O module.

FIG. 17 is a diagram of a distributed I/O module 400 including a front view and a perspective view. The distributed I/O module 400 can be a 1 Rack Unit (RU) (or similar, compact size), rack-mountable I/O expansion chassis which supports physical termination of legacy electrical signals, provides LED visual alarm indications for Central Office (CO) support personnel and utilizes CAT5/6 cable for interconnection to a tributary card. In an embodiment, the distributed I/O module 400 includes CAT5/6 connections 402 to a network element and various electrical I/O connections 404 for electrical interface termination. In this manner, the network element can have faceplate connectors, i.e., CAT5/6, which are connected to the CAT5/6 connections 402 that fan out on the legacy electrical interface terminations on the distributed I/O module 400.

Figure 18:
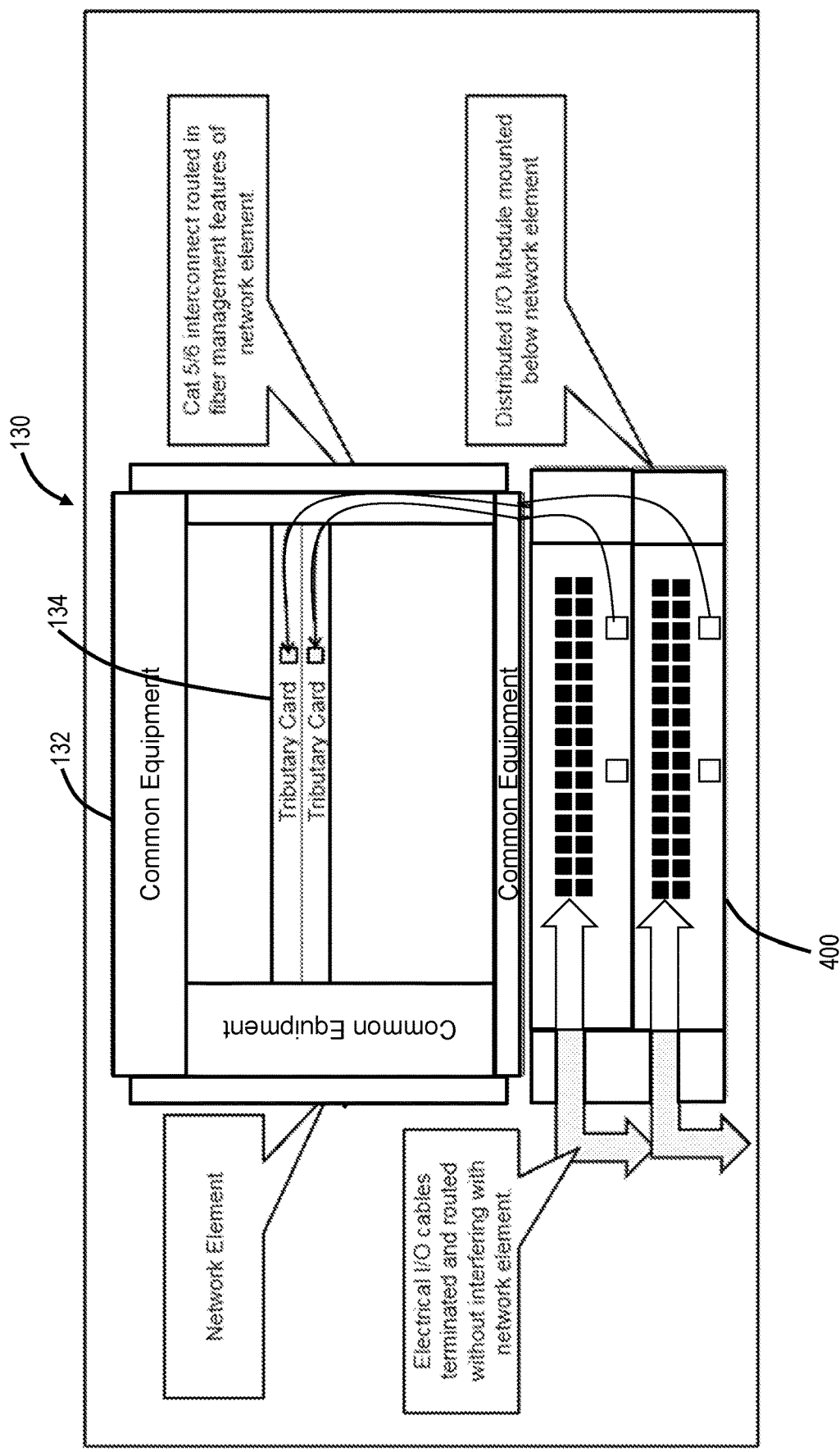
FIG. 18 is a block diagram illustrating the distributed I/O module installed with a network element.

FIG. 18 is a block diagram illustrating the distributed I/O module 400 installed with a network element 130. Here, the network element 130 includes two line modules 134 (tributary cards) each connected to a separate distributed I/O module 400. The distributed I/O module 400 allows legacy electrical interface terminations to be located away from the main transport or packet shelf and managed in a distributed fashion thus alleviating the faceplate termination constraints and cable management issues mentioned previously.

TDM Protection Process

Figure 19:
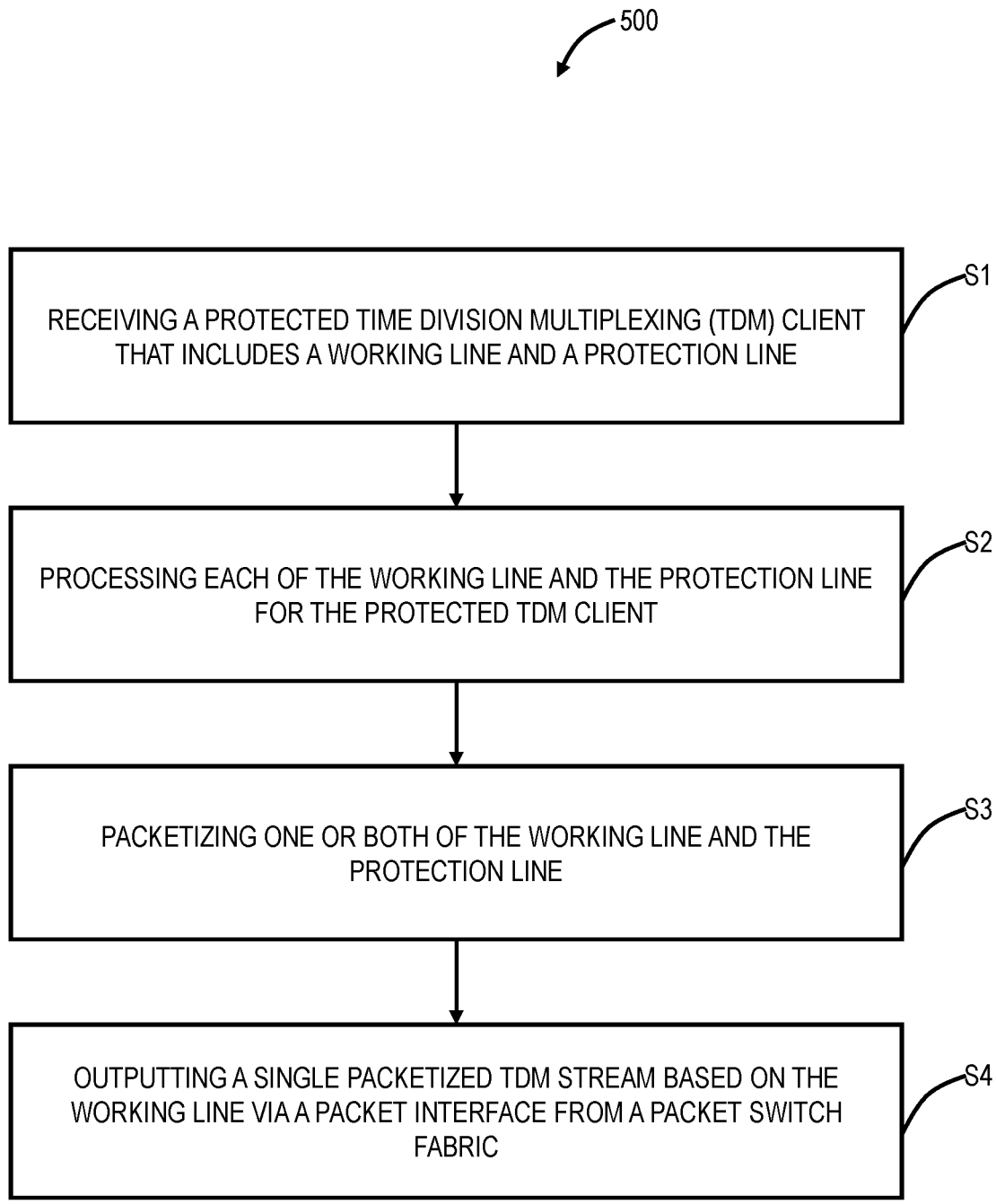
FIG. 19 is a flowchart of a TDM protection process via a packet network and packet network element.

FIG. 19 is a flowchart of a TDM protection process 500 via a packet network and packet network element. The TDM protection process 500 includes receiving a protected Time Division Multiplexing (TDM) client that includes a working line and a protection line (step S1); processing each of the working line and the protection line for the protected TDM client (step S2); packetizing one or both of the working line and the protection line (step S3); and outputting a single packetized TDM stream based on the working line via a packet interface from a packet switch fabric (step S4). The protected TDM service can be one of a Plesiochronous Digital Hierarchy (PDH) signal, Synchronous Optical Network (SONET) signal, and a Synchronous Digital Hierarchy (SDH) signal.

In an embodiment, the TDM protection process 500 further includes processing each of the working line and the protection line via a TDM fabric, wherein, for ingress, the TDM fabric is configured to select a working line of the protected TDM service for the packetizing, and, wherein, for egress, the TDM fabric is configured to broadcast the single packetized TDM stream to both the working line and the protection line of the protected TDM service.

In another embodiment, the TDM protection process 500 further includes operating a Link Aggregation Group (LAG) on the packet switch fabric with each leg of the LAG being connected to the working line and the protection line, and wherein switching between the working line and the protection line can be performed via LAG reconfiguration. The TDM protection process 500 can further include operating a Finite State Machine (FSM) to provides status to LAG control on the packet switch fabric.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A network element comprising:
   at least two Time Division Multiplexing (TDM) modules each including a TDM client interface, TDM processing circuitry, and circuit emulation circuitry; and
   a packet switch fabric connected to the at least two TDM modules and configured to output a packet interface,
   wherein a protected TDM service through the at least two TDM modules is provided as a single packetized TDM stream via the packet interface from the packet switch fabric, and
   wherein the network element includes
      a TDM fabric between the TDM processing circuitry and the circuit emulation circuitry in each of the at least two TDM modules, and the TDM fabric in each of the at least two TDM modules are interconnected to one another.

2. The network element of claim 1, wherein, for ingress, the TDM fabric is configured to select a working line of the protected TDM service for packetization by the circuit emulation circuitry, and, for egress, the TDM fabric is configured to broadcast the single TDM stream to both the working line and a protection line of the protected TDM service.

3. The network element of claim 1, wherein the TDM fabric is further configured to switch TDM signals between the at least two TDM modules, independent of the packet switch fabric.

4. The network element of claim 1, wherein each of the at least two TDM modules includes a Finite State Machine (FSM) that provides status to LAG control on the packet switch fabric.

5. The network element claim 1, wherein the at least two TDM modules include N TDM modules, N is an integer, and wherein there are N LAGs, one for each of the N TDM modules to support 1:N protection.

6. The network element of claim 1, wherein the protected TDM service is one of a Plesiochronous Digital Hierarchy (PDH) signal, Synchronous Optical Network (SONET) signal, and a Synchronous Digital Hierarchy (SDH) signal.

7. The network element of claim 1, further comprising
   a distributed input/output module connected to one of the at least two TDM modules via a cable and including a plurality of electrical interfaces.

8. An apparatus comprising:
   Time Division Multiplexing (TDM) processing circuitry configured to interface TDM clients;
   circuit emulation circuitry configured to packetize TDM traffic streams; and
   a packet switch fabric connected to the circuit emulation circuitry and configured to output a packet interface,
   wherein a protected TDM service through the TDM processing circuitry is provided as a single packetized TDM stream via the packet interface from the packet switch fabric, and
   wherein the apparatus includes:
      a TDM fabric between the TDM processing circuitry and the circuit emulation circuitry in each of at least two TDM modules, and the TDM fabric in each of the at least two TDM modules are interconnected to one another.

9. The apparatus of claim 8, wherein, for ingress, the TDM fabric is configured to select a working line of the protected TDM service for packetization by the circuit emulation circuitry, and, for egress, the TDM fabric is configured to broadcast the single TDM stream to both the working line and a protection line of the protected TDM service.

10. The apparatus of claim 8, wherein the TDM fabric is further configured to switch TDM signals between the TDM clients, independent of the packet switch fabric.

11. The apparatus of claim 8, further comprising
   a Finite State Machine (FSM) that provides status to LAG control on the packet switch fabric.

12. The apparatus of claim 8, wherein the protected TDM service include N TDM clients, N is an integer, and wherein there are N LAGs, one for each of the N TDM clients to support 1:N protection.

13. A method comprising:
   receiving a protected Time Division Multiplexing (TDM) client that includes a working line and a protection line;
   processing each of the working line and the protection line for the protected TDM client;
   packetizing one or both of the working line and the protection line;
   outputting a single packetized TDM stream based on the working line via a packet interface from a packet switch fabric; and
   processing each of the working line and the protection line includes, for ingress, a TDM fabric, in each of at least two TDM modules, between a TDM processing circuitry and a circuit emulation circuitry is configured to select the working line for the packetizing, and for egress, the TDM fabric is configured to broadcast the single TDM stream to both the working line and the protection line, and the TDM fabric in each of the at least two TDM modules are interconnected to one another.

14. The method of claim 13, further comprising operating a Finite State Machine (FSM) to provides status to LAG control on the packet switch fabric.

* * * * *